US007280933B2

(12) United States Patent
Nagae

(10) Patent No.: US 7,280,933 B2
(45) Date of Patent: Oct. 9, 2007

(54) METHOD AND APPARATUS FOR FORMING A PATTERN, DEVICE AND ELECTRONIC APPARATUS

(75) Inventor: Nobuaki Nagae, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/027,921

(22) Filed: Dec. 30, 2004

(65) Prior Publication Data

US 2005/0177343 A1 Aug. 11, 2005

(30) Foreign Application Priority Data

Jan. 15, 2004 (JP) ............................ 2004-007904

(51) Int. Cl.
*G01P 21/00* (2006.01)

(52) U.S. Cl. .......................... 702/95; 702/183; 347/19

(58) Field of Classification Search ................ 702/183
See application file for complete search history.

(56) References Cited

U.S. PATENT DOCUMENTS

| | | | | |
|---|---|---|---|---|
| 4,356,429 | A | 10/1982 | Tang | |
| 4,539,507 | A | 9/1985 | VanSlyke et al. | |
| 5,477,244 | A * | 12/1995 | Shibata et al. | 347/19 |
| 5,870,117 | A * | 2/1999 | Moore | 347/37 |
| 6,398,334 | B2 * | 6/2002 | Dunand | 347/14 |
| 6,420,834 | B2 * | 7/2002 | Yamazaki et al. | 315/169.3 |
| 6,623,096 | B1 * | 9/2003 | Castano et al. | 347/19 |
| 6,879,309 | B2 * | 4/2005 | Yamauchi et al. | 345/87 |
| 2004/0109038 | A1 * | 6/2004 | Newsome et al. | 347/19 |
| 2005/0024406 | A1 * | 2/2005 | Otsuki | 347/14 |

FOREIGN PATENT DOCUMENTS

| | | |
|---|---|---|
| JP | 63-070257 | 3/1988 |
| JP | 63-175860 | 7/1988 |
| JP | 02-135359 | 5/1990 |
| JP | 02-135361 | 5/1990 |
| JP | 02-209988 | 8/1990 |
| JP | 03-037992 | 2/1991 |

(Continued)

OTHER PUBLICATIONS

Communication from Japanese Patent Office regarding counterpart application.

*Primary Examiner*—Bryan Bui
*Assistant Examiner*—Jonathan Moffat
(74) *Attorney, Agent, or Firm*—Harness, Dickey & Pierce, P.L.C.

(57) ABSTRACT

A method for forming a pattern on a substrate, including the steps of: ejecting liquid drops from an ejection head having nozzles onto a reference plate on which a plurality of target positions are defined, the target positions being arranged in at least one row; detecting an amount of a displacement between the target positions and the positions at which the liquid drops have actually landed; determining a relative positional error relative to the ejection head for each of the at least one row of the target positions based on the amount of the displacement; determining a correction value for each of the at least one row based on the relative positional error; and sequentially changing a relative position of the substrate and the ejection head based on the corrections values when the liquid drops are being ejected onto the substrate.

4 Claims, 12 Drawing Sheets

FOREIGN PATENT DOCUMENTS

| | | |
|---|---|---|
| JP | 03-152184 | 6/1991 |
| JP | 09-033710 | 2/1997 |
| JP | 11-064626 | 3/1999 |
| JP | 2001-044601 | 2/2001 |
| JP | 2001-228321 | 8/2001 |
| JP | 2003-001175 | 1/2003 |
| JP | 2003-127392 | 5/2003 |
| JP | 2003-165209 | 6/2003 |
| JP | 2003-251243 | 9/2003 |
| JP | 2003-276170 | 9/2003 |
| JP | 2003-283104 | 10/2003 |

* cited by examiner

METHOD AND APPARATUS FOR FORMING A PATTERN, DEVICE AND ELECTRONIC APPARATUS

BACKGROUND OF THE INVENTION

1. Field of the Invention

The present invention relates to a method and apparatus that form a pattern by ejecting liquid drops from an ejection head onto predetermined positions on a substrate.

Priority is claimed on Japanese Patent Application No. 2004-7904, filed Jan. 15, 2004 the contents of which are incorporated herein by reference.

2. Description of Related Art

Manufacturing methods that employ a liquid drop ejection technique have attracted attention as methods for manufacturing devices having fine wiring patterns, such as semiconductor integrated circuits, and as methods for manufacturing liquid crystal displays or organic electroluminescence (EL) elements. In these manufacturing technologies, a material layer is formed (i.e., painted) on a substrate by ejecting a liquid material that contains a material used to form a pattern from an ejection head (i.e., an inkjet type head) onto a pattern forming screen so as to form a device. These manufacturing technologies are thus extremely effective in that they can be applied to small quantity—large variety production. Together with the advances towards increasing preciseness of pixels and the like in liquid crystal displays and organic EL displays, demands for increased precision and increased refinement in patterns that are formed on a substrate have been growing.

Because of this, as shown in Japanese Unexamined Patent Application, First Publication No. 2003-127392, a technology has been proposed that improves the landing accuracy of the liquid material by assembling ejection heads with a high degree of accuracy.

However, in the aforementioned technology, a dedicated apparatus is required in order to assemble the ejection heads with a high degree of accuracy, and consequently the problem arises that equipment costs are high. Moreover, if there is displacement in the relative position of the substrate and the ejection head, or if some errors is caused between each ejection head during assembly when a plurality of ejection heads are formed integrally, or if the drive shaft that moves the ejection head and the substrate relative to each other is deflected, then the problem arises that it is difficult to improve the landing accuracy of the liquid material.

SUMMARY OF THE INVENTION

The present invention was conceived in view of the above described circumstances, and it is an object thereof to provide an apparatus and the like that enable the accuracy of landing positions of liquid drops from an ejection head to be improved by correcting the relative positions between the ejection head and the substrate in each location even when the accuracy of the landing position of the liquid material is different in each location on the substrate.

In order to solve the problems described above, the first aspect of the present invention is a method for forming a pattern on a substrate, including the steps of: ejecting liquid drops from an ejection head having nozzles onto a reference plate on which a plurality of target positions are defined, the target positions being arranged in at least one row; detecting an amount of a displacement between the target positions and the positions at which the liquid drops have actually landed; determining a relative positional error relative to the ejection head for each of the at least one row of the target positions based on the amount of the displacement; determining a correction value for each of the at least one row based on the relative positional error; and sequentially changing a relative position of the substrate and the ejection head based on the corrections values while ejecting the liquid drops onto the substrate. According to this aspect, even if relative positional displacement is present between the substrate and the ejection head, or if the drive shaft that moves the ejection head relatively to the substrate is bent or the like, because the relative positions of the ejection head and the substrate are adjusted (i.e., corrected) in sequence for each position of the substrate such that the liquid drops land on the target positions, it is possible to accurately form a predetermined pattern on the substrate.

Moreover, in the method according to the first aspect of the present invention, the ejection head may include a plurality of ejection heads that are formed integrally, and the steps of detecting an amount of a displacement, determining a relative positional error, determining a correction value, and sequentially changing a relative position of the substrate and the ejection head may be carried out for each of the plurality of ejection heads. According to this aspect, even if relative positional displacement is present between the substrate and the ejection heads, or if the drive shaft that moves the ejection head relatively to the substrate is bent or the like, and if each of the plurality of ejection heads has an assembly error when they are integrated together, because the relative positions of the ejection heads and the substrate are adjusted (i.e., corrected) in sequence for each position of the substrate such that the droplets land on the target positions, it is possible to accurately form a predetermined pattern on the substrate.

Moreover, each of the at least one row of the target positions may correspond to the row of liquid drops that is ejected in a single ejection by a row of nozzles of the ejection head. In this case, because it is possible to simultaneously correct the accuracy of the landing position of the liquid drops that are ejected in a single ejection from the row of nozzles of an ejection head, the ejection task can be performed efficiently.

Moreover, the target positions may be determined based on a plurality of marks that are provided on the reference plate to match a spacing between the nozzles. In this case, because the liquid drops do not land on top of the marks, the relative positions of the marks and the liquid drops can be accurately determined using a visual method.

Moreover, the step of detecting an amount of a displacement may include the steps of: obtaining an image that includes the liquid drops that have landed on the reference plate and the plurality of marks; and determining an amount of the displacement between the target positions and the positions at which the liquid drops have actually landed based on the image. In this case, by performing image processing on the image that contains the liquid drops that have landed on the reference plate and the plurality of marks, the relative positions of the marks and the liquid drops can be easily determined.

Moreover, the step of detecting an amount of a displacement may be performed for each of the plurality of liquid drops that are ejected from the ejection head. In this case, it is possible to more accurately determine the relative positional error between the substrate and the liquid drops. In particular, it is also possible to determine any relative positional error in the rotational direction between the ejection head and the substrate, using the displacement amounts of a plurality of liquid drops.

The second aspect of the present invention is an apparatus for forming a pattern by ejecting liquid drops onto a substrate from an ejection head having nozzles while moving the ejection head and the substrate relatively to each other, including: a reference plate on which a plurality of marks are provided to match a spacing between the nozzles, target positions being determined based on the plurality of marks, the target positions being arranged in at least one row; an image detection unit that obtains an image that includes the liquid drops that have landed on the reference plate and the marks; a displacement amount detecting unit that detects from the image an amount of a displacement between target positions and the positions at which the liquid drops have actually landed; an error calculation unit that determines a relative positional error relative to the ejection head for each of the at least one row of the target positions based on the amount of the displacement; a correction value calculation unit that determines a correction value for each of the at least one row based on the relative positional errors; and a correction unit that sequentially changes the relative position of the substrate and the ejection head based on the corrections value when the liquid drops are being ejected onto the substrate. According to this aspect, even if relative positional displacement is present between the substrate and the ejection head, or if the drive shaft that moves the ejection head relatively to the substrate is bent or the like, because the relative positions of the ejection head and the substrate are adjusted (i.e., corrected) in sequence for each position of the substrate such that the liquid drops land on the target positions, it is possible to accurately form a predetermined pattern on the substrate.

In the apparatus according to the second aspect of the present invention, the ejection head may include a plurality of ejection heads that are formed integrally, and, based on the amount of the displacement, the error calculation unit may determine a relative positional error relative to the ejection head that has ejected the liquid drops onto a row for each of the at least one row of the target positions, and the correction value calculation unit may determine a correction value for each of the rows for each of the ejection heads based on the relative positional errors, and while ejecting the liquid drops onto the substrate, the correction unit may sequentially change the relative position of the substrate and each of the ejection heads based on the correction value for each ejection head. According to this aspect, even if relative positional displacement is present between the substrate and the ejection heads, or if the drive shaft that moves the ejection head relatively to the substrate is bent or the like, and if each of the plurality of ejection heads has an assembly error when they are integrated together, because the relative positions of the ejection heads and the substrate are adjusted (i.e., corrected) in sequence for each position of the substrate such that the liquid drops land on the target positions, it is possible to accurately form a predetermined pattern on the substrate.

According to the third aspect of the present invention, a device is manufactured using the method according to the first aspect or the pattern forming apparatus according to the second aspect. According to this aspect, because the pattern of the device can be accurately formed, a high-performance device can be provided. For example, electro-optical devices such as high-definition pixel displays can be manufactured.

According to the fourth aspect of the present invention, an electronic apparatus is provided with the device of the third aspect. According to this aspect, because a high-performance device is provided, a high-performance, high-quality electronic apparatus can be provided. For example, electronic apparatuses having easily visible display units can be manufactured.

BRIEF DESCRIPTION THE DRAWINGS

DETAILED DESCRIPTION OF THE INVENTION

Embodiments of the method and apparatus for forming a pattern, device, and electronic apparatus of the present invention will now be described with reference made to the drawings.

The pattern forming apparatus of the present invention will now be described with reference made to the drawings.

Figure 1:
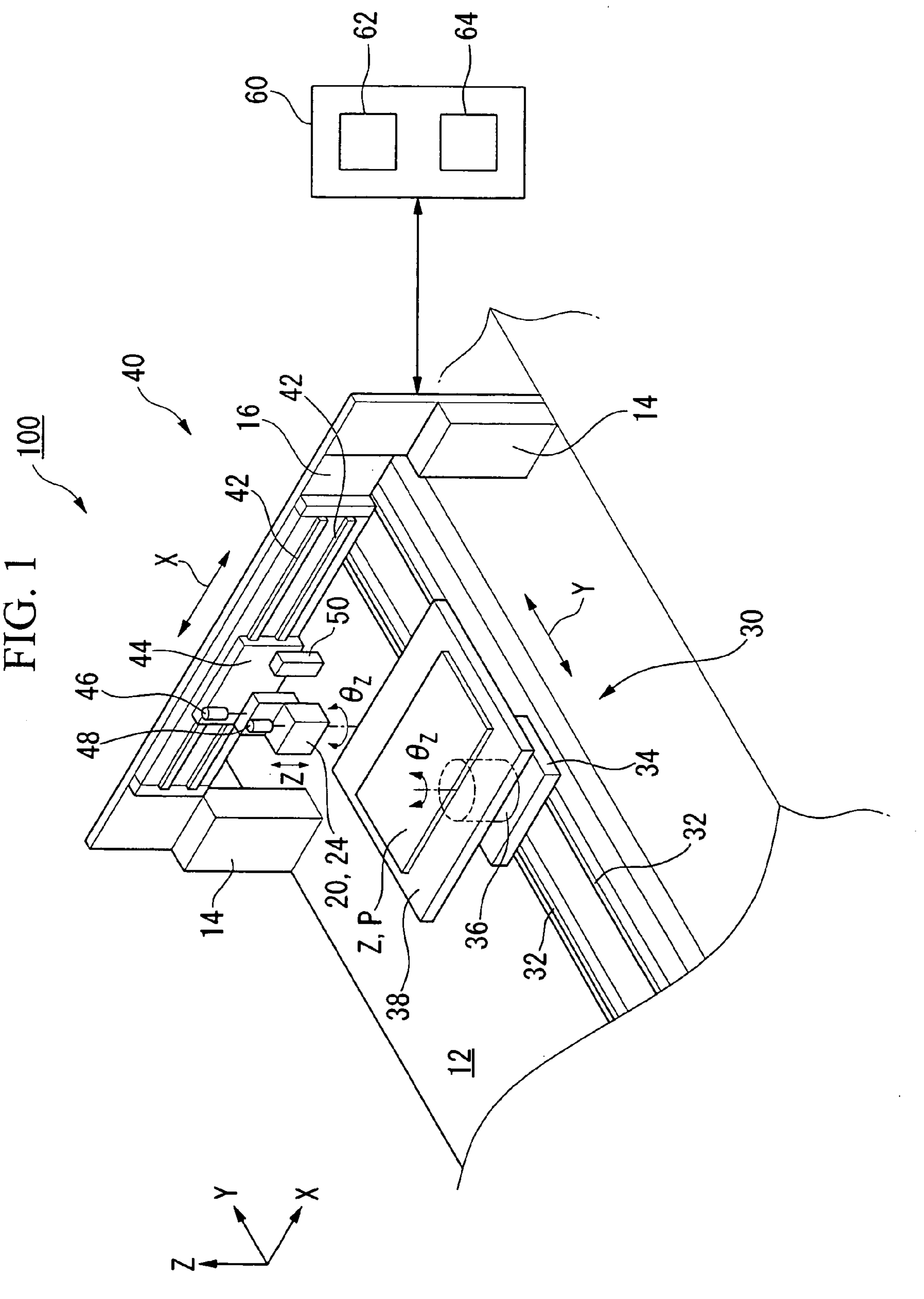
FIG. 1 is a perspective view showing a pattern forming apparatus 100.

FIG. 1 is a perspective view showing the pattern forming apparatus 100 of the present invention.

As shown in FIG. 1, the pattern forming apparatus 100 is a liquid drop ejection apparatus (i.e., an inkjet apparatus) that is capable of supplying a liquid material onto a substrate P or a reference plate Z in a predetermined pattern, and is provided with a base 12 that is arranged horizontally, a stage 38 that is provided on the base 12 and supports a substrate P or reference plate Z, a first shifting apparatus 30 that is placed between the base 12 and the stage 38 and movably supports the stage 38, an ejection head unit 20 that is capable of ejecting (i.e., dripping) predetermined quantities of liquid drops D of a liquid material that contains a predetermined material onto the substrate P or reference plate Z that is supported on the stage 38, and a second shifting apparatus 40 that movably supports the ejection head unit 20.

Furthermore, there is provided a camera that is used to detect positions at which the liquid drops D ejected from the ejection head unit 20 land on the reference plate Z, and a control unit 60 that controls operations of the pattern forming apparatus 100 and the like including ejection operations of the ejection head unit 20 and movement operations of the first shifting apparatus 30 and the second shifting apparatus 40.

Note that a direction running between the front and rear of the base 12 is taken as the Y direction, and, in contrast, a direction running between the left and right sides of the base 12 is taken as the X direction. A direction running vertical in relation to both the X direction and the Y direction is taken as the Z direction, and a rotation direction about the Z axis is taken as the θz direction.

The first shifting apparatus (i.e., correction unit) 30 is formed by guide rails 32 placed on the base 12, a slider 34 that is supported so as to be able to move along the guide rails 32, and a drive unit (not shown) such as a linear motor that moves the slider 34.

The slider 34 can be moved in the Y direction along the guide rails 32 and positioned by the first shifting apparatus 30 being driven in response to a command from the control unit 60.

The stage 38 is supported via a motor 36 used for rotation around the Z axis (i.e., θz) on the slider 34. The motor (i.e., correction unit) 36 may, for example, be a direct drive motor, and the stage 38 can be rotated in minute steps in the θz direction relative to the slider 34 by the driving of the motor 36.

Namely, the first shifting apparatus 30 supports the stage 38 such that it can move in the Y direction and in the θz direction.

In addition, the stage 38 holds the substrate P or reference plate Z, and the substrate P or reference plate Z is held by suction on the stage 38 using a suction holding apparatus (not shown) that is provided at a top surface of the stage 38.

The second shifting apparatus (i.e., correction unit) 40 is formed by two pillars 14 that stand upright substantially in the center of the base 12, a column 16 that is supported in the X direction by the pillars 14, guide rails 42 that are supported by the column 16, a slider 44 that is supported so as to be able to move in the X direction along the guide rails 42, and a drive unit (not shown) such as a linear motor that drives the slider 44.

The slider 44 can be moved in the X direction along the guide rails 42 and positioned by the second shifting apparatus 40 being driven in response to a command from the control unit 60.

A feed direction is the direction in which the slider 44 is moved by the second shifting apparatus 40, and this direction is orthogonal with a scan direction which is the direction in which the slider 34 is moved by the first shifting apparatus 30.

A carriage 24 that forms the ejection head unit 20 is supported via motors 46 and 48 on the slider 44.

By operating the motor 46, the ejection head unit 20 can be moved in minute steps up and down and positioned in the Z direction. By operating the motor (i.e., correction unit) 48, the ejection head 20 can be rotated in minute steps and positioned around the Z axis (i.e., in the θz direction).

Namely, the second shifting apparatus 40 supports the ejection head unit 20 such that it can move in the X direction, and supports the ejection head unit 20 such that it can move in minute steps in the Z direction and θz direction. As a result, the liquid drop ejection surface of the ejection head unit 20 can be accurately positioned relative to the substrate P or reference plate Z that has been placed on the stage 38.

Note that, if the liquid drop ejection surface of the ejection head unit 20 and top surface of the substrate P or the reference plate Z approach to within 1 mm of each other, then deviation of the ejected liquid drops from the planned path can be suppressed, and an improvement in the accuracy of the disposition of the liquid drops can be achieved.

In some cases, errors occur in the positioning of the substrate P or the reference plate Z using the first shifting apparatus 30, or in the positioning of the ejection head unit 20 using the second shifting apparatus 40 due to bending and the like in the guide rails 32 and 42. Accordingly, the relative positions of the ejection head unit 20 and the substrate P or the reference plate Z may become slightly displaced in the X direction, the Y direction, and the θz direction. In addition, the amount of this displacement is different in each location on the substrate P or reference plate Z.

Therefore, the liquid drops D that have landed on the substrate P or reference plate Z have a different landing accuracy in each location on the substrate P or reference plate Z.

Figure 2:
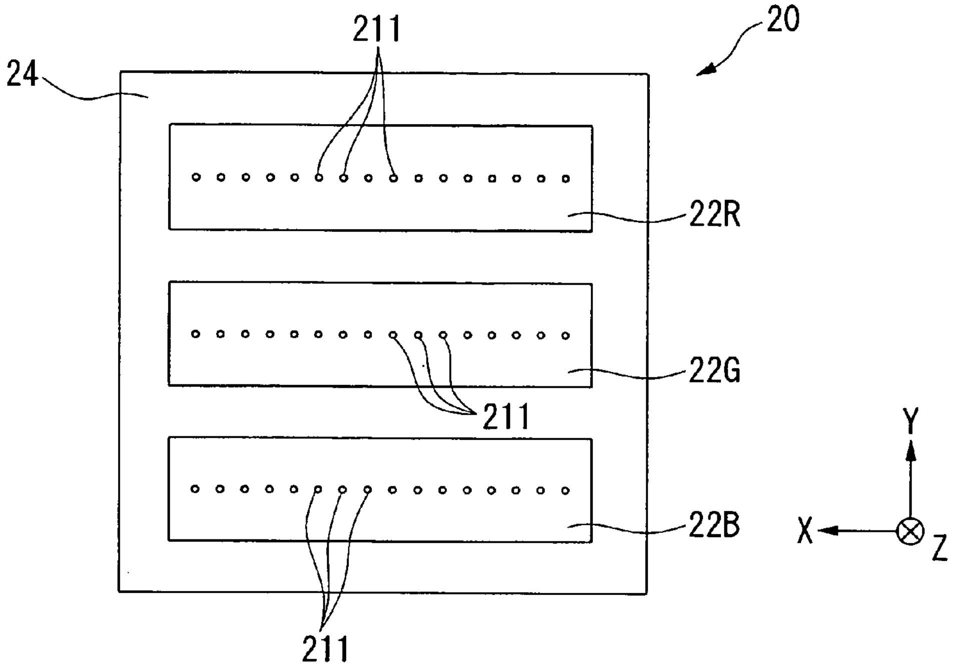
FIG. 2 is a view showing an ejection head unit 20.

FIG. 2 is a view of the ejection head unit 20 taken from the liquid drop ejection surface (i.e., the bottom surface) side.

The ejection head unit 20 includes three ejection heads 22 (i.e., 22R, 22G, and 22B), and either a different type or the same type of liquid material is ejected from each of these three ejection heads 22.

The ejection heads 22R, 22G, and 22B have an identical structure, and each of the ejection heads 22R, 22G, and 22B has a plurality of nozzles (i.e., nozzle holes) 211 that are arranged in a single row or in a plurality of rows. For example, if the resolution of an ejection head 22 is 180 dpi (i.e., 180 dots per square inch), then 180 nozzle holes 211 are formed in a row at a spacing of approximately 141 μm. Note that because the nozzle holes 211 are formed in a metal plate using an etching method or the like, they are placed in precise positions.

The respective ejection heads 22R, 22G, and 22B are assembled in the carriage 24, so as to form the integrated ejection head unit 20.

Note that the ejection heads 22R, 22G, and 22B are not always assembled accurately in the carriage 24, and, in some cases, there may be assembly errors in each of the X direction, the Y direction, and the θz direction relative to the positions at which the respective ejection heads 22R, 22G, and 22B should have been assembled. Accordingly, liquid drops D that are ejected from the ejection head unit 20 have a landing accuracy that relates to the assembly errors of the respective ejection heads 22.

Figure 3:
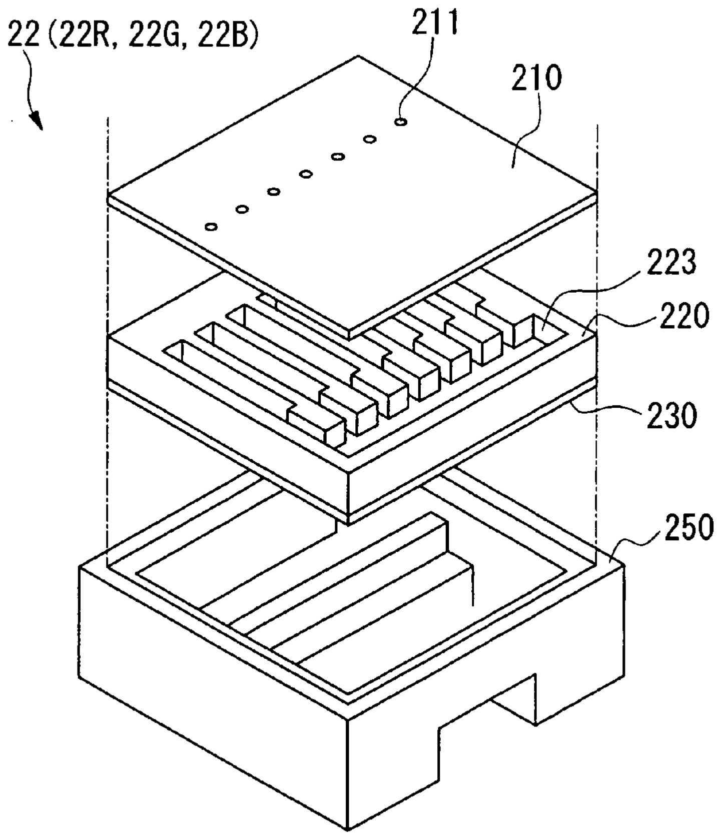
FIG. 3 is an exploded perspective view showing an ejection head 22.
Figure 4:
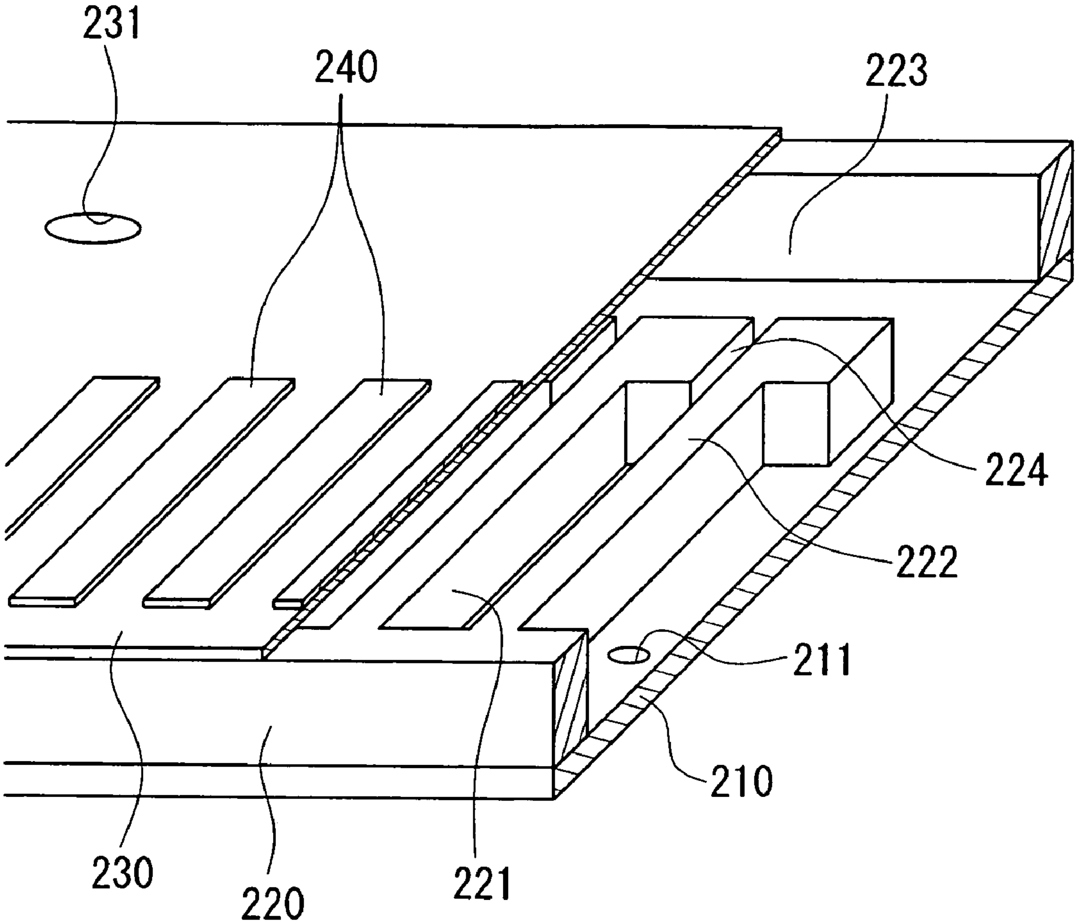
FIG. 4 is an exploded cross-sectional view showing the ejection head 22.

FIG. 3 is an exploded perspective view showing an ejection head 22, and FIG. 4 is a perspective cross-sectional view of the ejection head 22.

As shown in FIG. 3, the ejection heads 22 (22R, 22G, and 22B) are provided with a nozzle plate 210 having the nozzle holes 211, a pressure chamber substrate 220 having a diaphragm 230, and a housing 250 that supports the nozzle plate 210 and the diaphragm 230 which are fitted inside the housing 250. As shown in FIG. 4, the structure of the principal portions of the ejection heads 22 is one in which the pressure chamber substrate 220 is sandwiched by the nozzle plate 210 and the diaphragm 230. The nozzle holes (i.e., the nozzles) 211 are formed in the nozzle plate 210 in positions that correspond to cavities (i.e., the pressure chambers) 221 when the nozzle plate 210 is adhered to the pressure chamber substrate 220. A plurality of cavities 221 that are each capable of functioning as pressure chambers are provided in the pressure chamber substrate 220 by etching a silicon mono-crystal substrate or the like. The cavities 221 are separated from each other by side walls (i.e., partitioning walls) 222. Each cavity 221 is connected to a reservoir 223, which is a common flow path, via a supply path 224. The diaphragm 230 may be made of, for example, a thermal oxide film or the like. A structure is employed in which a liquid material tank inlet 231 is provided in the diaphragm 230, and a liquid material can be optionally supplied via a pipe (i.e., a flow path) from a tank (i.e., a liquid material containing section—not shown). Piezoelectric elements 240 are formed at positions corresponding to the cavities 221 on the diaphragm 230. The piezoelectric elements 240 have a structure in which a piezoelectric ceramic crystal such as a PZT element or the like is sandwiched by a top electrode and a bottom electrode (not shown). The piezoelectric elements 240 are structured so as to be able to generate a change in the volume thereof in response to an ejection signal that is supplied from the control unit 60.

In order to eject a liquid material from the ejection head unit 20, firstly, the control unit 60 supplies ejection signals (Spr, Spg, and Spb) to the ejection heads 22 (22R, 22G, and 22B) that cause liquid material to be ejected. The liquid material flows into the cavities 221 of the respective ejection heads 22, and in those ejection heads 22 to which an ejection signal has been supplied, a change in volume is generated in the piezoelectric element 240 thereof by a voltage being applied across the top electrode and the bottom electrode. This change in volume causes the diaphragm 230 to deform so that the volume of the cavities 221 is changed. As a result, liquid drops of liquid material are ejected from the nozzle holes 211 in these cavities 221. Liquid material that has been consumed due to the ejection is supplied from the tank to the cavities 221 from which the liquid material has been ejected.

Note that the ejection heads 22 have a structure in which liquid drops D of liquid material are ejected due to a change being generated in the volume of the piezoelectric elements 240, however, it is also possible to employ a structure in which liquid drops D are ejected due to the expansion that occurs when heat is applied from a heat generator to the liquid material.

Returning to FIG. 1, a camera (i.e., an image detecting unit) 50, such as a CCD camera, is provided in the ejection head unit 20 in order to detect liquid drops D that are ejected from the ejection head unit 20 towards the reference plate Z. The camera 50 is provided on a side of the ejection head unit 20 so as to face the reference plate Z, and is able to obtain an image of the top surface of the reference plate Z.

By operating the second shifting apparatus 40, the camera 50 is moved to an arbitrary position over the reference plate Z, and is able to obtain an image that includes liquid drops D that have landed on the top surface of the reference plate Z.

Image data obtained by the camera 50 is sent to a memory unit 64 of the control unit 60.

The control unit 60 has a calculation unit 62 that executes various types of calculation and a memory unit 64 that stores various types of information.

The calculation unit 62 (i.e., the displacement amount detection unit, the error calculation unit, and the correction unit) controls the operations of the pattern forming apparatus 100 including liquid material ejection operations by the ejection head unit 20 and shifting operations of the first shifting apparatus 30 and the second shifting apparatus 40.

The memory unit 64 stores image information that is sent from the camera 50. The calculation unit 62 processes these images, and determines the landing accuracy of the liquid drops. It also determines a correction value to improve the landing accuracy, so that an improvement in the landing accuracy can be achieved. Note that a method for improving the landing accuracy of the liquid drops is described below.

Figure 5A:
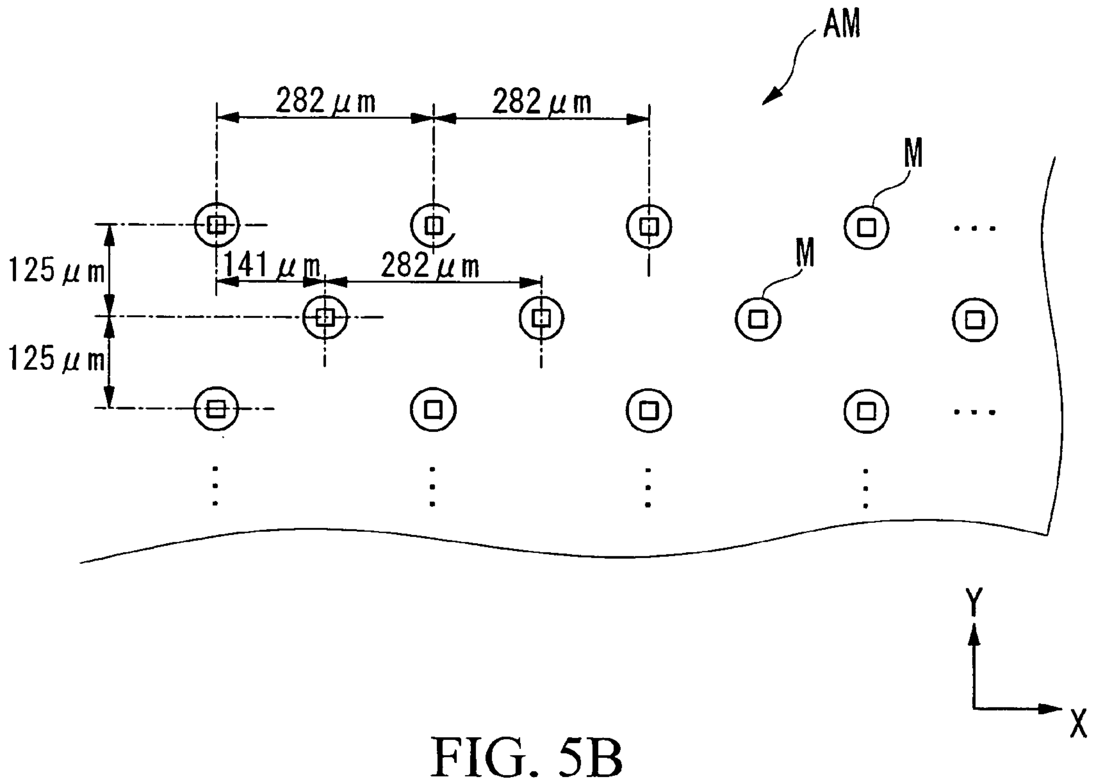
FIGS. 5A and 5B are views showing a mark M formed on a reference plate.
Figure 5B:
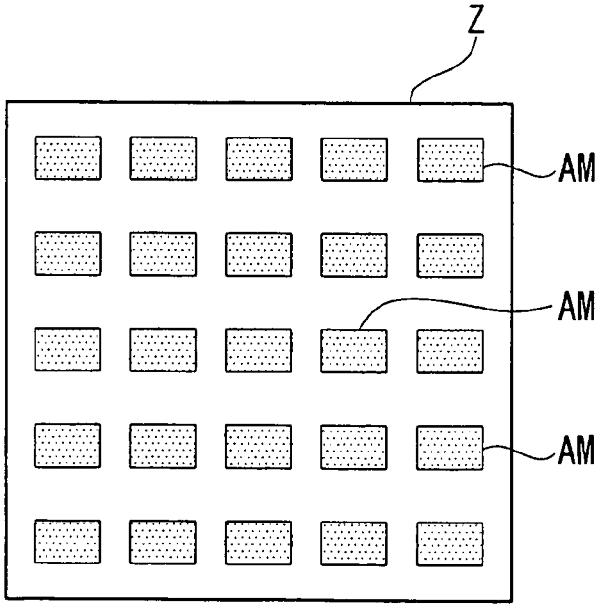

FIG. 5A and 5B are views showing a reference plate Z. FIG. 5A is a view showing marks M formed on the reference plate Z, while FIG. 5B is a view showing mark forming blocks AM.

A reference plate Z that is mounted on the stage 38 is a plate shaped member that is only used for detecting the landing accuracy of the liquid drops. The reference plate Z is obtained by forming marks M such as those shown in FIG. 5A in advance by vapor deposition or the like on a transparent material such as glass. The marks M are formed having approximately the same size as the liquid drops D that are ejected onto the reference plate Z from the ejection head unit 20. Note that the marks M may also have, for example, a cross-shaped configuration or the like.

The marks M are also placed at predetermined spacings in both the horizontal direction and vertical direction of the reference plate Z. The spacing in the horizontal (i.e., X) direction is set to a spacing of twice the spacing between the nozzle holes 211 of the ejection heads 22R, 22G, and 22B. Namely, as described above, because the nozzle spacing between the ejection heads 22R, 22G, and 22B is approximately 141 μm, the spacing between the marks M formed in the reference plate Z is approximately 282 μm.

The adjacent two rows of the marks M (in the X direction) are shifted each other with the same distance as the spacing between the nozzles. Namely, each of a second row of marks is formed in a position that is shifted in the X direction by the same distance as the spacing between the nozzles with respect to a first row of marks. In other words, as shown in FIG. 5A, the marks M are arranged in a polka dot pattern.

Note that spacing between the marks M in the longitudinal (i.e., the Y) direction is approximately half the spacing between the marks M in the transverse (i.e., the X) direction, and may be, for example, 125 μm.

Furthermore, the marks M may be formed on the entire surface of the reference plate Z, or may be formed only in a predetermined area on the reference plate Z. As shown in FIG. 5B, the blocks AM where the marks M are formed may be provided at a predetermined spacing. For example, the mark forming blocks AM may be provided at 13 locations in the X direction of the reference plate Z and at 48 locations in the Y direction to give a total of 624 locations.

Note that, in one mark forming blocks AM, 91 of the marks M are formed in the row (i.e., the X) direction and 14 of the marks M in the step (i.e., the Y) direction. Namely, 1274 marks M are formed in a single mark forming block AM.

Next, a description will be given of a method for improving the accuracy of an ejection of liquid drops onto the substrate P by ejecting liquid drops D onto the reference plate Z using the above described pattern forming apparatus 100.

Figure 6:
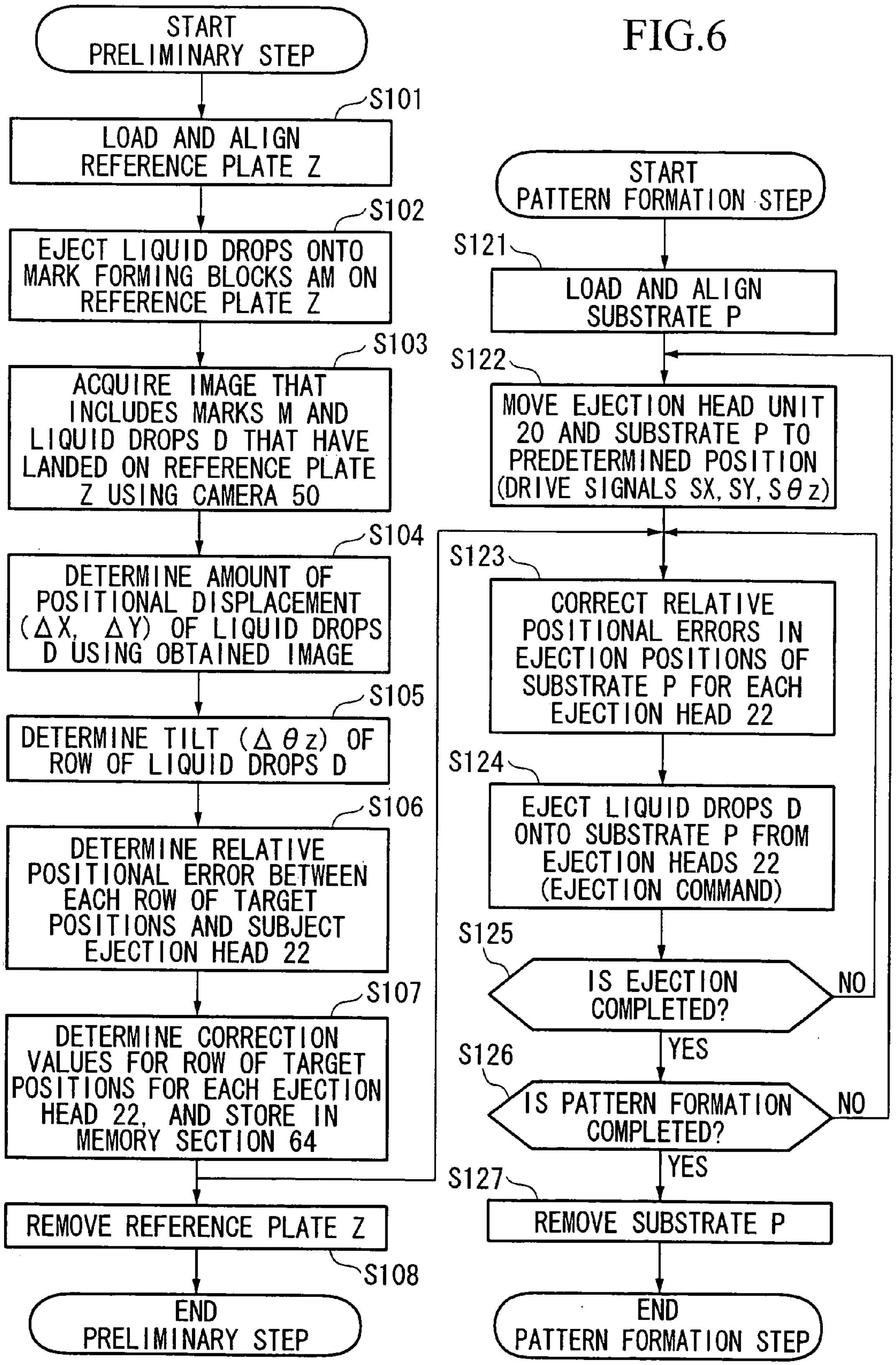
FIG. 6 is a flowchart showing a sequence for improving the liquid drop ejection accuracy of the pattern forming apparatus 100.
Figure 7:
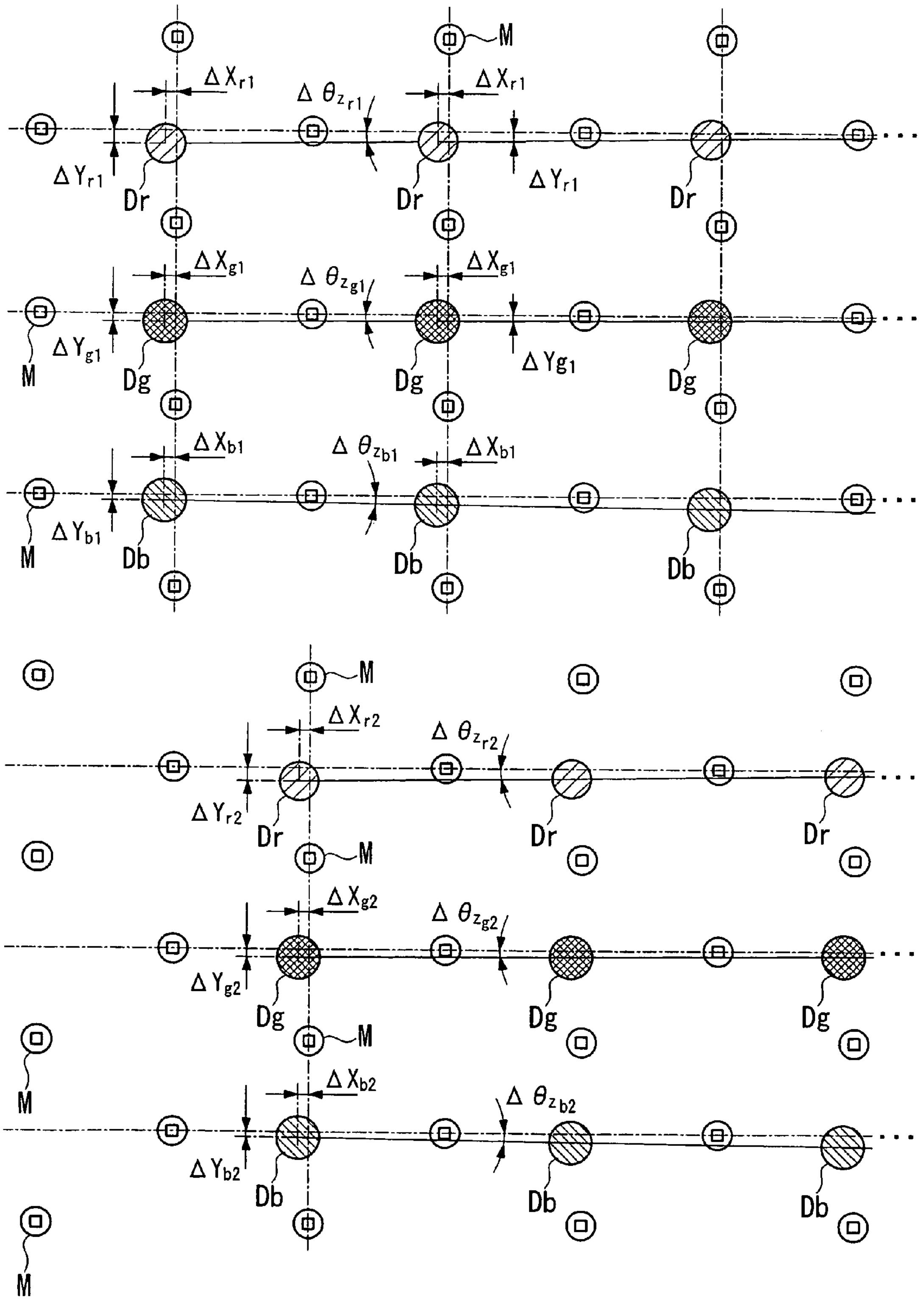
FIG. 7 is a view showing liquid drops D that have landed on the reference plate Z.

FIG. 6 is a flowchart showing a procedure for improving the liquid drop ejection accuracy of the pattern forming apparatus 100. FIG. 7 is a view showing liquid drops D that have landed on the reference plate Z.

Note that the liquid drops D of liquid material that are ejected from the ejection heads 22R, 22G, and 22B may be the same material, however, in the present embodiment, a description is given of when a red colored liquid material Dr is ejected from the ejection head 22R, a green colored liquid material Dg is ejected from the ejection head 22G, and a blue colored liquid material Db is ejected from the ejection head 22B.

Prior to the step of forming a pattern on the substrate P (i.e., prior to the pattern formation step), a preliminary step to determine correction values for correcting relative positional errors between the positions of the ejection heads 22 and the substrate P is performed.

Firstly, in step S101, a reference plate Z is loaded on the stage 38 by a substrate loader (not shown). At this time, alignment processing is performed on the reference plate Z using a predetermined method. As a result, the reference plate Z is accurately positioned on the stage.

Note that, because the substrate P that is loaded on the stage 38 in a subsequent step also undergoes alignment processing in the same manner, the reference plate Z and the substrate P are loaded in substantially identical positions.

However, there are some cases in which a constant error is constantly occurred in this alignment processing. There are also cases in which an assembly error has occurred between the ejection head unit 20 and the second shifting apparatus 40. Because of this, the reference plate Z or substrate P and the ejection head unit 20 have a constant relative positional error.

Next, in step S102, liquid drops D are ejected from the ejection head unit 20 onto the reference plate Z.

Specifically, firstly, the ejection head unit 20 is moved by the first shifting apparatus 30 to a predetermined position in the X direction, for example, to the outermost side (i.e., on the −X side), and preparations are made for an ejection onto the mark forming blocks AM that are formed on the reference plate Z.

Next, the reference plate Z is moved by the first shifting apparatus 30 at a predetermined constant rate in the Y direction, and liquid drops D are ejected from the ejection head unit 20 towards predetermined positions on the mark forming blocks AM on the reference plate Z that is being transported directly below it.

Note that, as shown in FIG. 7, the liquid drops D are ejected between marks M. Because the spacing between the marks M is set to twice the spacing between the nozzle holes 211, liquid drops D are ejected from every second nozzle hole 211 (for example, from odd-numbered nozzle holes 211). Namely, liquid drops D are ejected from 90 nozzle holes 211.

Liquid drops D are then ejected in sequence of red colored liquid drops Dr, green colored liquid drops Dg, and blue colored liquid drops Db as the reference plate Z moves in the Y direction (i.e., in the step direction of the marks M). The spacing between the liquid drops D in the Y direction (i.e., in the step direction of the marks M) is set to twice the spacing of the marks M in the step direction (i.e., to twice 125 μM).

Liquid drops D are then further ejected from 90 nozzle holes 211 that are different from the nozzle holes 211 from which the liquid drops D were previously ejected (for example, from even-numbered nozzle holes 211). In the same way, liquid drops D are also ejected from these nozzle holes 211 at twice the spacing in the step direction of the marks M in sequence of red colored liquid drops Dr, green colored liquid drops Dg, and blue colored liquid drops Db.

As a result of this, the task of ejecting liquid drops onto a single mark forming block AM is completed. When performing this liquid drop ejection task, the positions of the ejection head unit 20 in the X direction and θz direction, and the position of the reference plate Z in the θz direction are kept constant.

The reference plate Z is then moved in the Y direction, and the task of ejecting liquid drops onto the next mark forming block AM is performed. When the moving (i.e., scanning) of the reference plate Z in the Y direction is completed, the ejection head unit 20 is moved by a predetermined amount in the +X direction, and the reference plate Z is once again transported in the Y direction and the above described ejection task is performed.

Namely, the ejection head unit 20 is moved in steps in the X direction by the second shifting apparatus 40 while the reference plate Z is scan moved in the Y direction by the first shifting apparatus 30, and red colored Dr, green colored Dg, and blue colored Db liquid drops D are made to land on the mark forming blocks AM formed in 624locations on the reference plate Z.

Next, in step S103, images are obtained of all the liquid drops D that have landed on the reference plate Z using the camera 50. Namely, the same number of images as the number of liquid drops D that have landed on the reference plate Z (i.e., 90 nozzle holes×6 steps×624 areas) are obtained and sent to control unit 60. Specifically, for each liquid drop D that has landed on the reference plate Z, an image that includes that liquid drop D and the surrounding four marks M is obtained.

Note that the reason why liquid drops D are not ejected onto the marks M is because the marks M will be hidden by the red colored Dr, green colored Dg, and blue colored Db liquid drops D, and it becomes difficult for the marks M to be recognized by the camera 50. Moreover, the reason why liquid drops D are ejected from every other nozzle hole 211 is in order to prevent adjacent liquid drops D being detected in error when an image of one liquid drop D is being recognized by the camera 50, which possibility could arise due to the fact that the spacing between the nozzle holes 211 is narrow. Accordingly, provided that there is essentially no possibility of an erroneous detection, in the above described ejection step, it is also possible for liquid drops D to be ejected simultaneously from all of the nozzle holes 211 (in this case, it is necessary to form the marks M on the reference plate Z at the same spacing as the nozzle holes 211).

Next, in step S104, the calculation unit 62 performs image processing on the obtained images to detect the amount of displacement (ΔX and ΔY) between a target position indicated by the four marks M (i.e., a position connecting the center of the four marks M), and the landing position of the liquid drop D (i.e., the center position of the liquid drop D). This processing is performed for all of the landed liquid drops D.

Next, in step S105, the tilt between the row of marks M and the row of landed liquid drops D, namely, the amount of the displacement in the θz direction (i.e., Δθz) is determined from the amount of displacement of two or more liquid drops D in the row of liquid drops D.

Next, in step S106, for each row of target positions on the reference plate Z, the relative positional error between this row and the ejection head 22 that ejected liquid drops D onto that row (referred to below as the subject ejection head 22) is determined from the displacement determined in steps S104 and S105.

Here, the term "row of target positions" refers to a row (i.e., a line) that connects the 90 target positions that are the targets for the 90 liquid drops D that are ejected simultaneously from the row of nozzle holes 211 of the respective ejection heads 22R, 22G and 22B to land on. Accordingly, 6 (steps of) rows of target positions are present in a single mark forming block AM. Therefore, for example, in the case of the at least one row of the target positions that correspond to the row of liquid drops Dr that have landed on the topmost step of FIG. 7, the relative positional error with the ejection head 22R is determined.

Values determined in step S105 can be used as they are for the amounts of displacement in the θz direction (i.e., Δθzrn)

of the relative positional errors in the respective rows of target positions (i.e., ΔXrn, ΔYrn, Δθzrn: wherein n is an identification number of the at least one row of the target positions). The amounts of displacement in the X direction and Y direction (i.e., ΔXrn, ΔYrn) are determined from the average values of the amounts of displacement in the X direction and Y direction (i.e., ΔXd, ΔYd) with the 90 liquid drops D being calculated as having been rotated by Δθz.

Here, the center of rotation in the calculation is the center of rotation of the ejection head unit 20, or the center of rotation of the stage 38. When making a correction, either one of or both of the ejection head unit 20 and the stage 38 are moved, however, depending on the method of correction, the amounts of displacement in the X direction or Y direction after the calculation (i.e., ΔXd, ΔYd) is a different value.

As a result of this, the relative positional displacement between each row of target positions of the reference plate Z and the subject ejection head 22 of that row is determined.

Next, in step S107, correction values for correcting the relative positional errors relative to the rows of target positions onto which the liquid drops D have been ejected for all of the mark forming blocks AM on the reference plate Z, and for each one of the ejection heads 22R, 22G, and 22B, namely, the inverse numbers (i.e., ΔXrn, ΔYrn, and Δθzrn) are determined from the relative positional errors of each row of target positions determined in step S106.

Therefore, in the case of the ejection head 22R, because a single mark forming block AM has two correction values, 1248 (i.e., 2×624 locations) correction values are determined for the entire surface of the reference plate Z.

The correction values for each ejection head 22 (i.e., three correction value data files) are sent to the memory unit 64 and stored.

Note that, as has been described above, each ejection head 22R, 22G, and 22B has two correction values in each single mark forming block AM, however, it is also possible to assume that odd-numbered nozzle rows and even-numbered nozzle rows are of different ejection heads, and, for each of the six ejection heads, to determine 624 correction values over the entire surface of the reference plate Z. This is in order to more accurately correct the amount of displacement in the positions at which the liquid drops D have landed. In this case, six correction value data files are sent to the memory unit 64.

Next, in step S108, by withdrawing the reference plate Z from the top of the stage 38, the preliminary steps prior to the pattern formation steps are completed.

Next, as shown in FIG. 6, a step to form a predetermined pattern by ejecting liquid drops D onto a substrate P in order to manufacture an EL display device or color filter is begun.

Firstly, in step S121, a substrate P is accurately loaded onto the stage 38 by a substrate loader. As described above, the substrate P is accurately loaded in an identical position to the position where the reference plate Z was loaded on the stage 38.

Next, in step S122, the calculation unit 62 of the control unit 60 sends drive signals (SX, SY, and Sθz) to the first shifting apparatus 30, the second shifting apparatus 40, and the motors 36 and 48, thereby moving the ejection head unit 20 and the substrate P.

Next, in step S123, when ejecting liquid drops Dr from the ejection head 22R, correction values (i.e., −ΔXrn, −ΔYrn, and −Δθzrn) corresponding to the ejection positions from among the correction value data relating to the ejection head 22R that is stored in the memory unit 64 is sent to the first shifting apparatus 30, the second shifting apparatus 40, and the motors 36 and 48, and the relative positions of the ejection head 22R and the substrate P are changed.

Next, in step S124, an ejection signal (Spr) is sent the ejection head 22R, and a pattern forming (i.e., ejection) operation is conducted to form a predetermined pattern on the substrate P.

Note that the correction value data for each ejection head 22 that was determined in the preliminary steps was determined only for predetermined positions on the reference plate Z. Accordingly, there may be cases in which correction values corresponding to ejection positions on the substrate P have not been determined. Because of this, between step S107 and step S123, it is desirable that processing is performed using a predetermined method in order to provide supplementary correction values for positions for which correction values are not present from the correction value data of each ejection head 22. By performing correction value supplementary processing in this manner, it is possible to correct the relative positions of the ejection heads 22 and the substrate P more accurately.

Next, in step S125, a determination is made as to whether or not the ejection of liquid drops D from each ejection head 22R, 22G, and 22B has been completed. Namely, the steps of step S122 through step S124 are performed three times in the sequence of the ejection head 22R, the ejection head 22G and the ejection head 22B.

Depending on the pattern being formed, it may not be necessary for the respective liquid drops Dr, Dg, and Db to be ejected from all of the ejection heads 22R, 22G, and 22B.

Moreover, as described above, if odd-numbered nozzle rows and even-numbered nozzle rows are assumed as being different ejection heads within each ejection head 22, so that six ejection heads are present, then the steps of step S122 through S124 may be performed six times for each nozzle row.

In step S125, a determination is made as to whether or not the formation of the pattern has been completed. Namely, the processing of step S122 through step S124 is repeated and a predetermined pattern is formed on the substrate P.

Finally, in step S126, by unloading the substrate P away from the stage 38, the pattern formation step is completed.

In this manner, when the ejection heads 22 eject liquid drops D onto the substrate P, it is possible, in accordance with the ejection target positions of the liquid drops D and the ejection head 22 that is ejecting the liquid drops D onto those positions, to eject the liquid drops D by slightly changing the relative positions of the substrate P and the ejection head 22 (i.e., in the X direction, the Y direction, and the θz rotation direction) from the position that is instructed at first.

Accordingly, in cases such as when there is relative positional displacement between the substrate P and the respective ejection heads 22 or when the drive shaft that moves the respective ejection heads 22 and the substrate P relatively to each other is bent or the like, or even when the ejection heads 22R, 22G, and 22B each have an assembly error in their mounting on the carriage 24, the relative positions of the respective ejection heads 22R, 22G, and 22B and the substrate P are corrected sequentially one by one, and each of the liquid drops Dr, Dg, and Db lands on the correct position.

Note that, in order to change the relative positions of the substrate P and the respective ejection heads 22 in the X direction, they are moved in minute steps by the second shifting apparatus 40. Moreover, in order to change the relative positions of the substrate P and the respective ejection heads 22 in the Y direction, in addition to moving them in minute steps using the first shifting apparatus 30, it is also possible to change the instruction timing of the ejection signals from the control unit 60 to each ejection head 22. In addition, in order to change the relative positions of the substrate P and the respective ejection heads 22 in the θz direction, either one of the motors 36 and 48 can be driven. Alternatively, both of the motors 36 and 48 can each be driven.

As has been described above, according to the pattern forming apparatus 100, because relative positional errors between a substrate P and a plurality of ejection heads 22 are corrected in accordance with the ejection heads 22 at the time of an ejection of liquid drops D over the entire surface of the substrate P, it is possible to cause the liquid drops D that have been ejected from the ejection head unit 20 to land precisely in predetermined positions on the substrate P. Accordingly, using the pattern forming apparatus 100 it is possible to manufacture color filters and EL display devices having a high level of accuracy.

Note that, in the above described embodiment, a description is given of an example in which three ejection heads 22 are provided in the ejection head unit 20, however, the same processing can be performed if one ejection head 22, or two ejection heads 22, or four or more ejection heads 22 are provided.

Moreover, in the above described embodiment, a case is described in which each ejection head 22 has one row of nozzles, however, if each ejection head 22 has a plurality of rows of nozzles, each row of nozzles can be assumed to be one ejection head 22 and the same processing as in the above described embodiment can be performed.

Next, a description will be given of an example of a method for forming a laminated wiring pattern on the substrate P by stacking a plurality of layers of material on the substrate P by ejecting liquid drops D of liquid material from the ejection head unit 20 onto the substrate P using the pattern forming apparatus 100 having the structure described above.

In the description given below, a process to manufacture an organic electroluminescence (EL) display device 600 and a thin film transistor (TFT) to drive this organic EL display device 600 is given as an example.

An EL display device 600 has a structure in which a thin film that contains fluorescent inorganic and organic compounds is sandwiched by a cathode and an anode, and is an element that generates excitons by injecting and then recombining electrons and holes in the thin film, and then generates light using the discharge of light (i.e., fluorescence and phosphorescence) when these excitons are deactivated.

Here, as described above, the pattern forming apparatus 100 is provided with a plurality of ejection heads 22 (i.e., 22R, 22G, and 22B), and liquid drops D of liquid materials that each contain a different material are ejected from the respective ejection heads 22. The liquid materials are formed by changing the materials into fine particles and then forming it into a paste using a solvent and a binder. The liquid materials are set to viscosity (for example, 50 cps or less) that enables them to be ejected from the respective ejection heads 22.

In addition, as described above, prior to the manufacturing of the EL display device 600, liquid drops D are ejected onto the reference plate Z and correction values (i.e., ΔXr, ΔYr, Δθzr, ΔXg, ΔYg, Δθzg, ΔXb, ΔYb, Δθzb, and the like) are determined for each ejection head 22. When ejecting the liquid drops D onto the substrate P from the respective ejection heads 22, the relative positions of the substrate P and the respective ejection heads 22 are corrected, and the liquid drops D are ejected onto accurate positions.

After the liquid material that contains the first material has been ejected from the ejection head 22R from among the plurality of ejection heads 22 onto the substrate P, this liquid material is dried (i.e., baked). Next, the liquid material that contains the second material is ejected from the ejection head 22G onto the first material layer and this liquid material is then dried (i.e., baked). Thereafter, by performing the same processing using the plurality of ejection heads, a plurality of material layers are stacked onto the substrate P, so that a multi-layer wiring pattern is formed.

Figure 8:
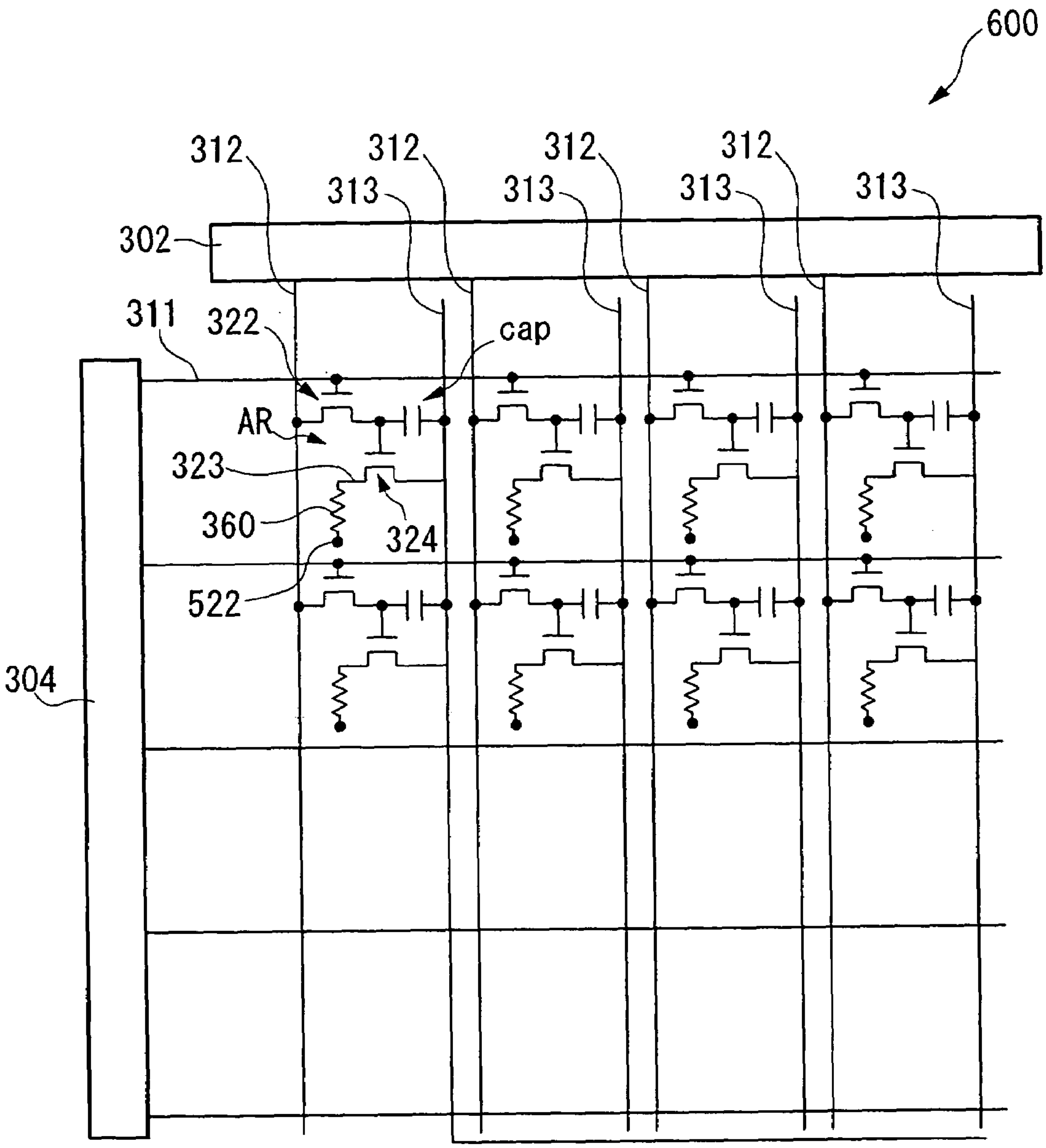
FIG. 8 is a circuit diagram of an organic EL display device 600.
Figure 9:
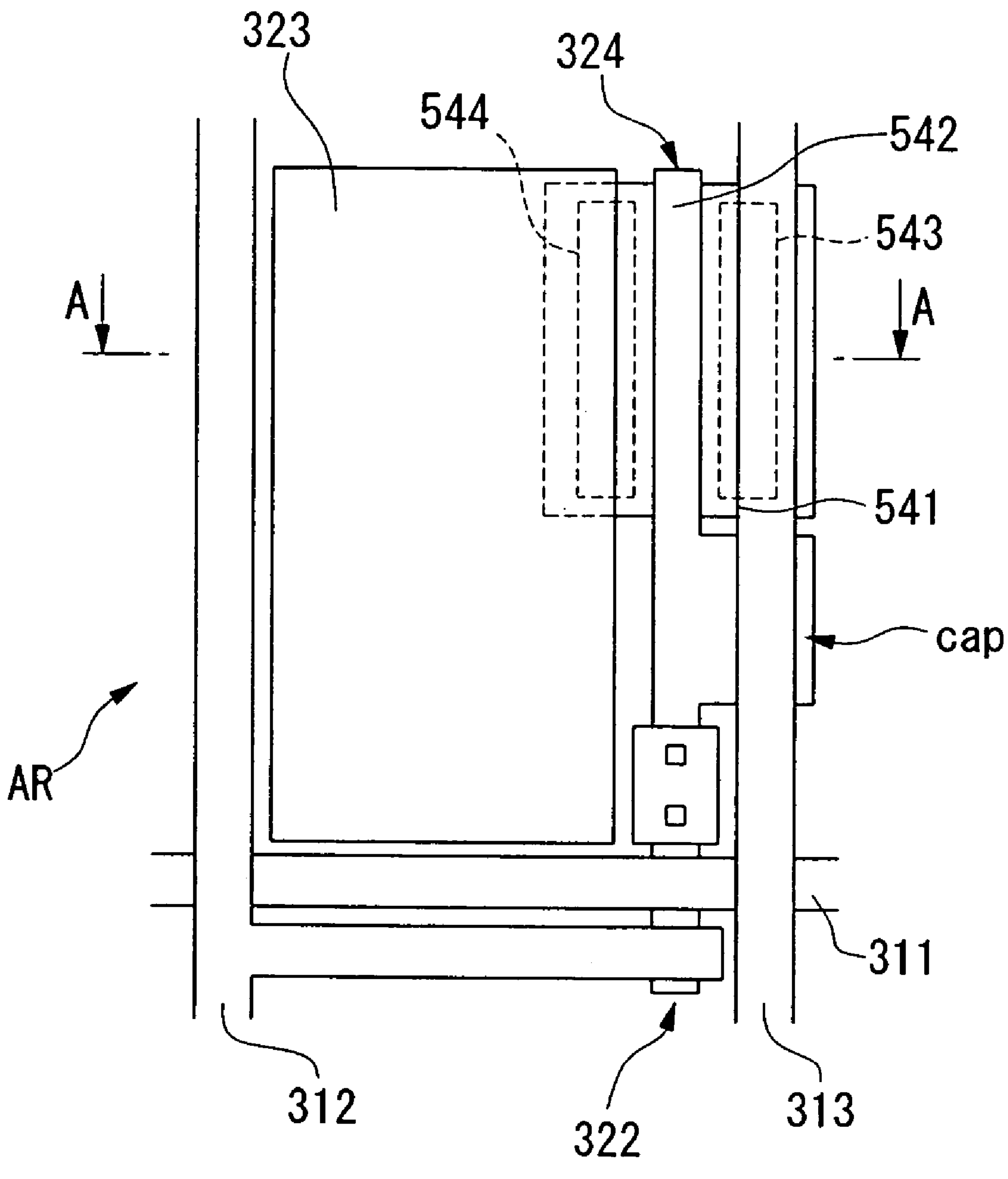
FIG. 9 is an enlarged plan view of a pixel.
Figure 10:
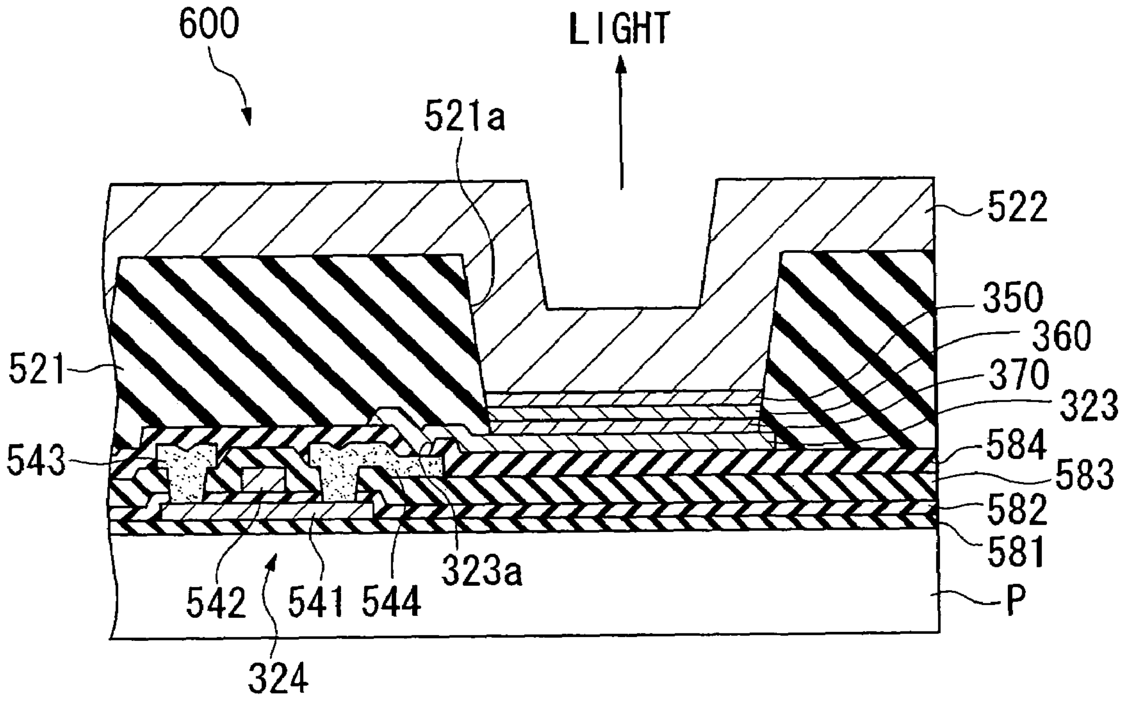
FIG. 10 is a cross-sectional view taken across a line A-A shown in FIG. 9.

FIG. 8, FIG. 9, and FIG. 10 are views showing an example of an active matrix type of display device that uses organic electroluminescence elements. FIG. 8 is a circuit diagram of the organic EL display device 600, FIG. 9 is an enlarged plan view of pixel portions in a state in which the counter electrodes and organic electroluminescence elements have been removed, and FIG. 10 is a cross-sectional view taken along the line A-A in FIG. 9.

As shown in the circuit diagram in FIG. 8, the organic EL display device 600 is formed by laying a plurality of scan lines 311 on a substrate, and laying a plurality of signal lines 312 such that they extend in a direction that is orthogonal to the scan lines 311. A plurality of common power supply lines 313 are then laid so as to extend in parallel with the signal lines 312. A pixel AR is provided at each intersection point of the scan lines 311 and the signal lines 312.

A data line drive circuit 302 that is provided with a shift register, a level shifter, a video line, and an analog switch is provided for the signal lines 312.

In contrast, a scan line drive circuit 304 that is provided with a shift register and a level shifter is provided for the scan lines 311. Each pixel area AR is provided with a first thin film transistor 322 to which gate electrode scan signals are supplied via the scan line 311, a retention capacitor "cap" that holds image signals that are supplied from the signal line 312 via the first thin film transistor 322, a second thin film transistor 324 to which gate electrode image signals held by the retention capacitor "cap" are supplied, a pixel electrode 323 that is supplied with drive current from the common power supply line 313 when the pixel electrode 323 is electrically connected to the common power supply line 313 via the second thin film transistor 324, and a light emitting section (i.e., a light emitting layer) 360 that is interposed between the pixel electrode (i.e., anode) 323 and a counter electrode (i.e., cathode) 522.

In this type of structure, when the scan line 311 is driven and the first thin film transistor 322 is turned on, the potential of the signal line 312 at that time is held in the retention capacitor "cap", and the conducting state of the second thin film transistor 324 is determined in accordance with the state of the retention capacitor "cap". Current is then supplied to the pixel electrode 323 from the common power supply line 313 via the channel of the second thin film transistor 324, and as a result of this current then being further supplied to the counter electrode 522 through the light emitting layer 360, the light emitting layer 360 emits light in accordance with the amount of current that is being supplied.

Here, as shown in FIG. 9, the planar structure of each pixel AR is such that four sides of a pixel electrode 323, which has a rectangular planar configuration, are surrounded by a signal line 312, a common power supply line 313, a scan line 311, and another scan line (not shown) that is used for a pixel electrode.

Note that the organic EL display device 600 shown in FIG. 10 is what is known as a top emission type in which light is extracted from the opposite side from the substrate P side where a thin film transistor (TFT) is placed.

Examples of the material used to form the substrate P include glass, quartz, sapphire, or synthetic resins such as polyester, polyacrylate, polycarbonate, and polyether ketone. Here, if the organic EL display device 600 is a top emission type, the substrate P may be opaque. In this case, a ceramic such as alumina, a material obtained by performing an insulation treatment such as surface oxidation on a sheet of metal such as stainless steel, thermosetting resin, or thermoplastic resin can be used. Note that, in the present invention, the substrate P is formed so as to have flexibility.

In contrast, in what is known as a back emission type of organic EL display device 600 in which light is extracted from the substrate side, which is the side where the TFT is placed, a transparent material is used as the substrate. Examples of transparent materials or semi-transparent materials that are able to transmit light include transparent glass, quartz, sapphire, or transparent synthetic resins such as polyester, polyacrylate, polycarbonate, and polyether ketone.

In particular, soda glass, which is low in cost, is preferably used as the material for forming the substrate.

As shown in FIG. 10, a top emission type of organic EL display device 600 has a substrate P, an anode (i.e., pixel electrode) 323 formed from a transparent electrode material such as indium tin oxide (ITO), a hole transporting layer 370 that is able to. transport holes from the anode 323, a light emitting layer (i.e., an organic EL layer or electro-optical element) 360 that contains an organic EL substance (which is one type of electro-optical material), an electron transporting layer 350 that is provided on a top surface of the light emitting layer 360, a cathode (i.e., a counter electrode) 522 formed from aluminum (Al), magnesium (Mg), gold (Au), silver (Ag), or calcium (Ca) that is provided on a top surface of the electron transporting layer 350, and a thin film transistor (hereinafter, referred to as a TFT) 324 that is formed on top of the substrate P and serves as a conduction control section that controls whether or not data signals are written to the pixel electrode 323. The TFT 324 operates based on operation instruction signals from the scan line drive circuit 304 and the data line drive circuit 302, and controls the conduction of electricity to the pixel electrode 323.

The TFT 324 is provided on a surface of the substrate P via a protective layer 581 whose main component is $SiO_2$. This TFT 324 is provided with a silicon layer 541 that is formed on a top layer of the protective layer 581, a gate insulating layer 582 that is provided on a top layer of the protective layer 581 so as to cover the silicon layer 541, a gate electrode 542 that is provided in a portion of a top surface of the gate insulating layer 582 that opposes the silicon layer 541, a first interlayer insulating layer 583 that is provided on a top layer of the gate insulating layer 582 so as to cover the gate electrode 542, a source electrode 543 that is connected with the silicon layer 541 via a contact hole that opens through the gate insulating layer 582 and the first interlayer insulating layer 583, a drain electrode 544 that is provided in a position opposing the source electrode 543 and sandwiching the gate electrode 542 and that is connected with the silicon layer 541 via a contact hole that opens through the gate insulating layer 582 and the first interlayer insulating glass 583, and a second interlayer insulating layer 584 that is provided on a top layer of the first interlayer insulating layer 583 so as to cover the source electrode 543 and the drain electrode 544.

The pixel electrode 323 is placed on a top surface of the second interlayer insulating layer 584, and the pixel electrode 323 and the drain electrode 544 are connected via a contact hole 323*a* that is provided in the second interlayer insulating layer 584. In addition, a third insulating layer (i.e., a bank layer) 521 that is made of synthetic resin or the like is provided between the cathode 522 and portions of the surface of the second interlayer insulating layer 584 other than those portions where the organic EL elements are provided.

Note that, in the silicon layer 541, an area that is located above the gate electrode 542 sandwiching the gate insulating layer 582 is the channel area. Moreover, on the silicon layer 541, a source area is provided on the source side of the channel area and a drain area is provided on the drain side of the channel area. Of these, the source area is connected to the source electrode 543 via a contact hole that opens through the gate insulating layer 582 and the first interlayer insulating layer 583. The drain area is connected to the drain electrode 544, which is formed by the same layer as the source electrode 543, via a contact hole that opens through the gate insulating layer 582 and the first interlayer insulating layer 583. The pixel electrode 323 is connected to the drain area of the silicon layer 541 via the drain electrode 544.

Next, a process to manufacture the organic EL display device 600 shown in FIG. 10 will be described with reference made to FIGS. 11A to 11E and FIGS. 12A to 12E.

Figure 11A:
FIGS. 11A to 11E are views showing a manufacturing process of the organic EL display device 600.

Firstly, the silicon layer 541 is formed on the substrate P. When forming the silicon layer 541, firstly, as shown in FIG. 11A, the protective layer 581, which is formed by a silicon oxide film having a thickness of approximately 200 to 500 nm by a plasma CVD method using tetraethoxysilane (TEOS) and an oxidation gas or the like as the raw material, is formed on the surface of the substrate P.

Figure 11B:
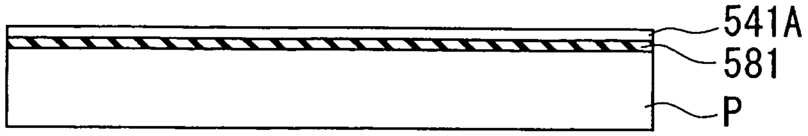

Next, as shown in FIG. 11B, the temperature of the substrate P is set to approximately 350° C., and a semiconductor layer 541A, which is formed by an amorphous silicon film having a thickness of approximately 30 to 70 nm using a plasma CVD method or an ICVD method, is formed on the surface of the protective layer 581. Next, a crystallization step is performed on the semiconductor layer 541A using a laser annealing method, a rapid heating method, or a solid phase epitaxy or the like, so that the semiconductor layer 541A is crystallized into a polysilicon layer. In the laser annealing method, using, for example, the line beam of an excimer laser having a beam length of 400 mm, the output intensity thereof is set, for example, to 200 $mJ/cm^2$. Regarding the line beam, the line beam is scanned such that a portion corresponding to 90% of the peak value of the laser intensity in the transverse direction thereof overlaps in each area.

Figure 11C:
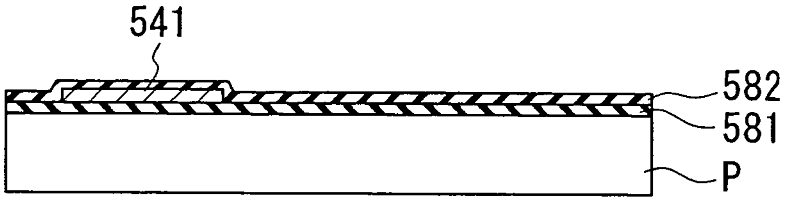

Next, as shown in FIG. 11C, the semiconductor layer (i.e., the polysilicon layer) 541A is patterned to form an island shaped silicon layer 541. After this, the gate insulating layer 582, which is formed by a silicon oxide film or nitride film having a thickness of approximately 60 to 150 nm by a plasma CVD method using TEOS and oxidation gas or the like as the raw material, is formed on the surface of the silicon layer 541. Note that the silicon layer 541 forms the channel area and the source and drain areas of the second thin film transistor 324 that is shown in FIG. 8, however, a semiconductor film that forms the channel area and source and drain areas of the first thin film transistor 322 is also formed in a different cross-sectional position thereof. In other words, the two types of transistors 322 and 324 are formed at the same time, however, because they are formed by the same procedure, in the description given below, when describing the transistors, only the second thin film transistor 324 is described, and a description of the first thin film transistor 322 is omitted.

Note that the gate insulating layer 582 may also be a silicon oxide film (i.e., an $SiO_2$ film) having porosity. A gate insulating layer 528 that is formed by a $SiO_2$ film having porosity is formed by a CVD method (i.e., a chemical vapor deposition method) using $Si_2H_6$ and $O_3$ as reaction gases. If these reaction gases are used, $SiO_2$ having large grains is formed in the vapor phase, and this $SiO_2$ having large grains deposits on the silicon layer 541 and the protective layer 581. Therefore, the gate insulating layer 582 has a large amount of spaces in the layer so as to form a porous body. In addition, as a result of the gate insulating layer 582 being a porous body, it has a low dielectric constant.

It is also possible for hydrogen plasma treatment to be performed on the surface of the gate insulating layer 582. By performing such a treatment, the dangling bond in the Si—O bond on the surface of the spaces is replaced by a Si—H bond, so that the moisture absorption resisting properties of the film are improved. In addition, it is also possible to provide another $SiO_2$ layer on the surface of the gate insulating film 582 after it has undergone the plasma processing. By employing this method, a low dielectric constant insulating layer can be formed.

Moreover, as the reaction gas that is used when the gate insulating layer 582 is formed using the CVD method, in addition to $Si_2H_6+O_3$, it is also possible to use $Si_2H_6+O_2$, $Si_3H_8+O_3$, and $Si_3H_8+O_2$. Furthermore, in addition to the above described reaction gas, it is also possible to use a reaction gas containing boron (B) or a reaction gas containing fluorine (F).

Furthermore, it is also possible to form the gate insulating layer 582 using an inkjet method (i.e., a liquid drop ejection method). Examples of the liquid material that is ejected from the ejection head in order to form the gate insulating layer 582 include a material obtained by dispersing a material such as the aforementioned $SiO_2$ or the like in a suitable solvent so as to form a paste, and a sol that contains an insulating material. The sol that contains an insulating material may be prepared by dissolving a silane compound such as tetraethoxysilane in a suitable solvent such as ethanol, or a composition of matter that chelate salts of aluminum, organic alkali metal salts, or organic alkali earth metal salts. The resulting material is then baked so that only an inorganic oxide is remained. The gate insulating layer 582 that is formed using an inkjet method subsequently undergoes preliminary drying.

When forming the gate insulating layer 582 using an inkjet method, before performing a ejection operation in order to form the gate insulating layer 582, it is also possible to perform a surface treatment on the protective layer 581 and the silicon layer 541 to control the affinity to the liquid material. The surface treatment in this case is a liquid affinity imparting treatment such as a UV or plasma treatment. By performing such a treatment, the liquid material that is used to form the gate insulating layer 582 adheres closely to the protective layer 581 and the like, and is flattened.

Figure 11D:
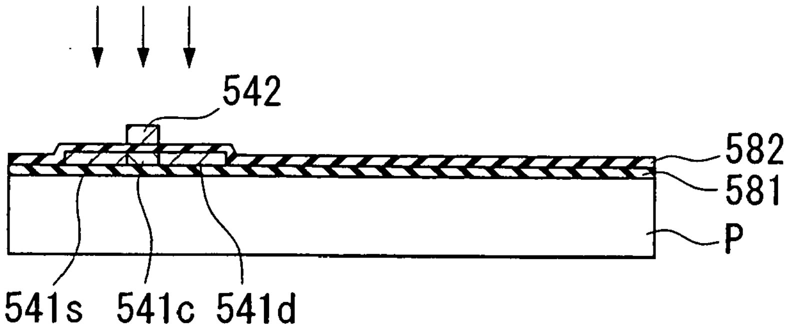

Next, as shown in FIG. 11D, a conductive film containing a metal such as aluminum, tantalum, molybdenum, titanium, tungsten or the like is formed on the gate insulating layer 582 using a sputtering method. This film is then patterned so as to form the gate electrode 542. In this state, phosphorous ions are then implanted at a high concentration into the layer, so as to form a source area 541*s* and a drain area 541*d* in the silicon layer 541 that self-align relative to the gate electrode 542. In this case, the gate electrode 542 is used as a patterning mask. Note that regions where no impurities have been introduced define the channel areas 541*c*.

Figure 11E:
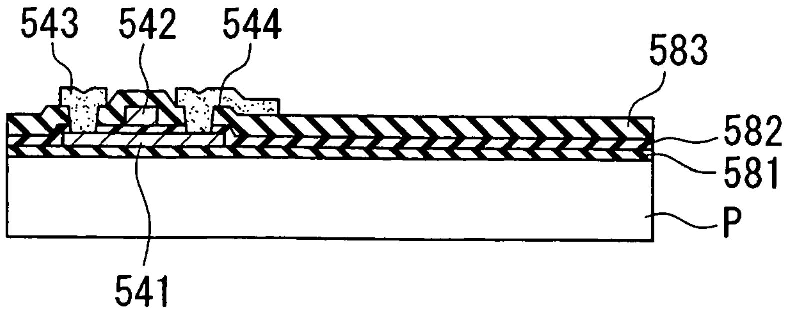

Next, as shown in FIG. 11E, the first interlayer insulating layer 583 is formed. In the same way as the gate insulating layer 582, the first interlayer insulating layer 583 is formed by a silicon oxide film or nitride film or by a silicon oxide film having porosity, and is formed using the same procedure as the method used to form the gate insulating layer 582 on the top layer of the gate insulating layer 582.

Furthermore, it is also possible for the step of forming the first interlayer insulating layer 583 to be performed using an inkjet method in the same way as in the step of forming the gate insulating layer 582. Examples of the liquid material that is ejected from the ejection head in order to form the first interlayer insulating layer 583 include, in the same way as for the gate insulating layer 582, a material obtained by dispersing a material such as $SiO_2$ or the like in a suitable solvent so as to form a paste, and a sol that contains an insulating material. The sol that contains an insulating material may be prepared by dissolving a silane compound such as tetraethoxysilane in a suitable solvent such as ethanol, or a composition of matter that chelate salts of aluminum, organic alkali metal salts, or organic alkali earth metal salts. The resulting material is then baked so that only an inorganic oxide is remained. The first interlayer insulating layer 583 that is formed using an inkjet method subsequently undergoes preliminary drying.

When forming the first interlayer insulating layer 583 using an inkjet method, before performing a ejection operation in order to form the first interlayer insulating layer 583, it is also possible to perform a surface treatment on the top surface of the gate insulating layer 582 to control the affinity to the liquid material. The surface treatment in this case is a liquid affinity imparting treatment such as a UV or plasma treatment. By performing such a treatment, the liquid material that is used to form the first interlayer insulating layer 583 adheres closely to the gate insulating layer 582 and the like, and is flattened.

By then patterning the first interlayer insulating layer 583 and the gate insulating layer 582 using a photolithographic method, contact holes that are to be the source electrode and drain electrode can be formed. Next, after a conductive layer formed from a metal such as aluminum, chromium, or tantalum is formed so as to cover the first interlayer insulating layer 583, a patterning mask is provided so as to cover areas where the source electrode and drain electrode are to be formed on this conductive layer, and the conductive layer is patterned. As result, the source electrode 543 and the drain electrode 544 are formed.

Next, although omitted from the drawings, a signal line, a common power supply line, and a scan line are formed on the first interlayer insulating layer 583. At this time, as described below, a region that is surrounded by these lines defines a pixel that forms a light emitting layer or the like. Therefore, for example, if a back emission type is to be formed, the respective lines are formed such that the TFT 324 is not positioned directly below a region that is surrounded by the respective lines.

Figure 12A:
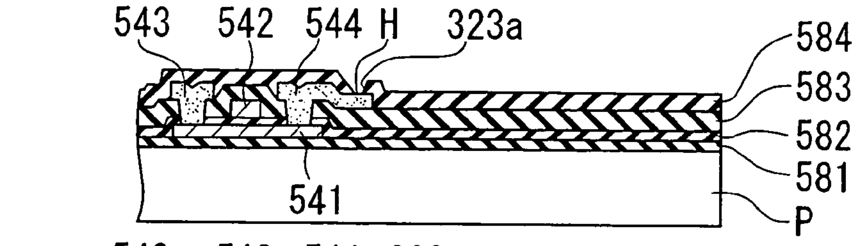
FIGS. 12A to 12E are views showing a manufacturing process continuing on from FIG. 11.

Next, as shown in FIG. 12A, the second interlayer insulating layer 584 is formed so as to cover the first interlayer insulating layer 583, the electrodes 543 and 544, and the respective lines (not shown).

The second interlayer insulating layer 584 is formed by an inkjet method. Here, as shown in FIG. 12A, the control unit 60 of the pattern forming apparatus 100 sets a non-ejection area (i.e., a non-drip area) H on the top surface of the drain electrode 544, and forms the second interlayer insulating layer 584 by ejecting liquid material that is used to form the second interlayer insulating layer 584 so as to cover portions of the drain electrode 544, the source electrode 543 and the first interlayer insulating layer 583 except for the non-ejection area H. As a result of this, the contact hole 323*a* is defined. Alternatively, the contact hole 323*a* may be formed by a photolithographic method.

Examples of the liquid material that is ejected from the ejection head in order to form the second interlayer insulating layer 584 include, similar to the first interlayer insulating layer 583, a material obtained by dispersing a material such as $SiO_2$ or the like in a suitable solvent so as to form a paste, and a sol that contains an insulating material. The sol that contains an insulating material may be prepared by dissolving a silane compound such as tetraethoxysilane in a suitable solvent such as ethanol, or a composition of matter that chelate salts of aluminum, organic alkali metal salts, or organic alkali earth metal salts. The resulting material is then baked so that only an inorganic oxide is remained. The second interlayer insulating layer 584 that is formed using an inkjet method subsequently undergoes preliminary drying.

When forming the second interlayer insulating layer 584 using an inkjet method, before performing a ejection operation in order to form the second interlayer insulating layer 584, it is also possible to perform a surface treatment on the non-ejection areas H of the drain electrode 544 to control the affinity to the liquid material. The surface treatment in this case is a liquid repellency treatment. By performing such a treatment, the liquid material will not be disposed on the non-ejection areas H, and the contact hole 323*a* can be formed stably. Moreover, by performing a liquid affinity imparting treatment on the top surface of the drain electrode 544 except for the non-ejection areas H, on the top surface of the source electrode 543, and on the top surface of the first interlayer insulating layer 583, the liquid material that is used to form the second interlayer insulating layer 584 adheres closely to the first interlayer insulating layer 583, the source electrode 543, and portions of the drain electrode 544 other than the non-ejection areas H, and is flattened.

Figure 12B:
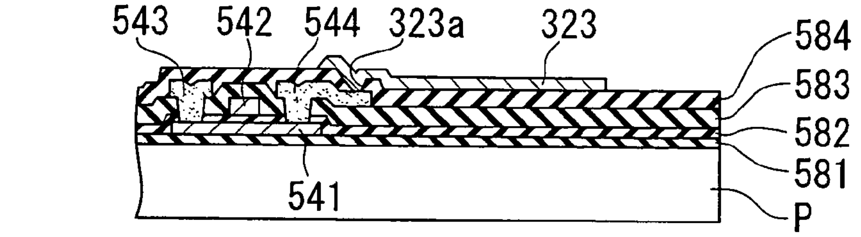

In this manner, once the second interlayer insulating layer 584 has been formed on the top layer of the drain electrode 544 while the contact hole 323*a* is formed on a portion of the drain electrode 544 in the second interlayer insulating layer 584, as shown in FIG. 12B, a conductive material such as ITO is patterned so as to fill the contact hole 323*a* with the conductive material, namely, so as to connect to the drain electrode 544 via the contact hole 323*a*, and thus the pixel electrode (i.e., the anode) 323 is formed.

The anode 323 that is connected to the organic EL element is formed by a transparent electrode material such as $SnO_2$ doped with ITO or fluorine, or ZnO or polyamine, and is connected to the drain electrode 544 of the TFT 323 via the contact hole 323*a*. The anode 323 is defined by forming a film that is formed from this transparent electrode material on the top surface of the second interlayer insulating layer 584, and then patterning this film.

Figure 12C:
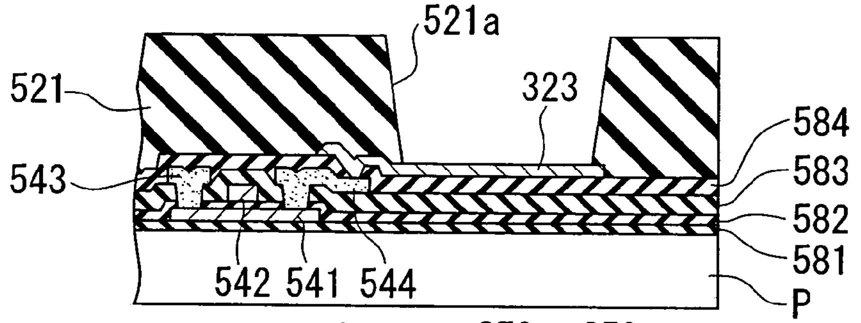

Once the anode 323 has been formed, as shown in FIG. 12C, an organic bank layer, which is the third insulating layer 521, is formed so as to cover predetermined positions of the second interlayer insulating layer 584 and a portion of the anode 323. The third insulating layer 521 is made of a synthetic resin such as an acrylic resin or a polyimide resin. Specific methods for forming the third insulating layer 521 include, for example, forming an insulating layer by coating a material obtained by dissolving a resist such as an acrylic resin or polyimide resin in a solvent using a spin coating or dip coating method. Note that the material of the insulating layer may be any suitable material provided that it does not dissolve in the liquid material solvent that is described below and can be easily patterned by etching or the like. Then, by forming an opening 521*a* by simultaneously etching the insulating layer using photolithography, the third insulating layer 521 that is provided with an opening 521*a* can be formed.

Here, a region exhibiting an affinity to liquid and a region exhibiting liquid repellency will be defined on the surface of the third insulating layer 521. In the present embodiment, each region is formed by a plasma treatment step. Specifically, the plasma treatment step has a preliminary heating step, a liquid affinity imparting step in which an inner wall of the opening 521 a and an electrode surface of the pixel electrode 323 are imparted with an affinity to liquid, a liquid repellency imparting step in which the top surface of the third insulating layer 521 is imparted with liquid repellency, and a cooling step.

Namely, a substrate (i.e., the substrate P that includes the third insulating layer and the like) is heated to a predetermined temperature (for example, about 70° C. to 80° C.). Next, for the liquid affinity imparting step, a plasma treatment (i.e., $O_2$ plasma treatment) is performed using oxygen as a reaction gas in the atmosphere. Next, for the liquid repellency step, a plasma treatment (i.e., $CF_4$ plasma treatment) is performed using methane tetrafluoride as the reaction gas in the atmosphere. The substrate that had been heated for the plasma treatment is then cooled to room temperature so that a substrate having predetermined liquid affinity imparted region and liquid repellent region is obtained. Note that the electrode surface of the pixel electrode 323 is also slightly affected by this $CF_4$ plasma treatment, however because ITO and the like, which is the material of the pixel electrode 323, has little affinity to fluorine, the hydroxyl groups that have been provided in the liquid affinity imparting step are not replaced by fluorine groups, so that the affinity to liquid is retained.

Figure 12D:
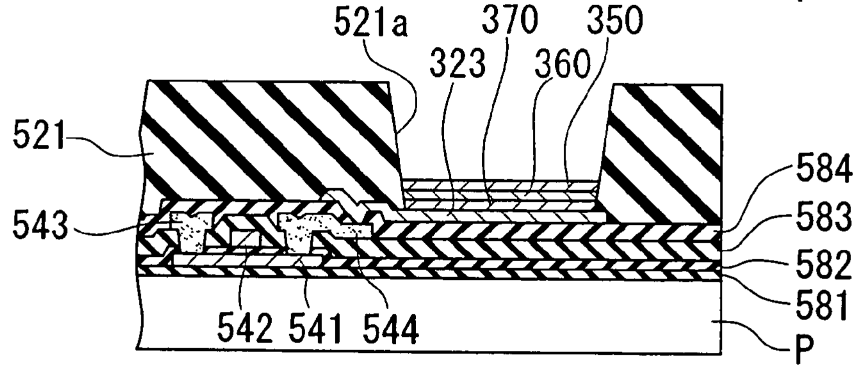

Next, as shown in FIG. 12D, the hole transporting layer 370 is formed on the top surface of the anode 323. Here, the material used to form the hole transporting layer 370 is not particularly limited, and a known material can be used. For example, triphenylamine derivatives (TPD), pyrazoline derivatives, arylamine derivatives, stilbene derivatives, triphenyldiamine derivatives, and the like can be used. Specific examples include the materials disclosed in Japanese Unexamined Patent Application, First Publication Nos. S63-70257, S63-175860, H02-135359, H02-135361, H02-209988, H03-37992, and H03-152184, however, triphenyldiamine derivatives are preferable and, among these, 4,4'-bis (N(3-methylphenyl)-N-phenylamino) biphenyl is preferably used.

Note that, instead of a hole transporting layer, it is also possible to form a hole injection layer, and it is also possible to form both a hole injection layer and a hole transporting layer. In this case, examples of the material used to form the hole injection layer include copper phthalocyanine (CuPc), polyphenylene vinylene which is a polytetrahydrothiophenylphenylene, 1,1-bis-(4-N, N-ditolylaminophenyl) cyclohexane, tris (8-hydroxyquinolinole) aluminum, and the like. Copper phthalocyanine (CuPc) is particularly preferably used.

When forming the hole injection/transporting layer 370, an inkjet method is used. Namely, a composition of matter in a liquid form that contains a material for the aforementioned hole injection/transporting layer is ejected onto the electrode surface of the anode 323. Preliminary drying is then performed thereon, so that the hole injection/transporting layer 370 is formed on the anode 323. Note that the steps after this hole injection/transporting layer formation step are preferably conducted in an inert gas atmosphere such as a nitrogen atmosphere or an argon atmosphere in order to prevent oxidation of the hole injection/transporting layer 370 and the light emitting layer (i.e., the organic EL layer) 360. For example, an ejection head (not shown) may be filled with a composition of matter in a liquid form that contains a material of the hole injection/transporting layer, the ejection nozzles of the ejection head are then positioned opposing to the electrode surface of the anode 323, ink liquid drops are ejected onto the electrode surface with the amount of liquid per single liquid drop from the ejection nozzles being controlled as the ejection head and the base material (i.e., the substrate P) are shifted relatively to each other. Next, polar solvents contained in the composition of matter in a liquid form are evaporated by performing drying on the ejected liquid drops, thereby forming the hole injection/transporting layer 370.

As the composition of matter in a liquid form it is possible to use, for example, a liquid material that is obtained by dissolving a mixture of a polythiophene derivative such as polyethylene dioxythiophene and polystyrene sulfonate or the like in a polar solvent such as isopropyl alcohol. Here, the ejected liquid drops spread over the electrode surface of the anode 323, which has undergone liquid affinity imparting treatment, and fills up the proximity of the bottom of the opening 521*a*. In contrast, the liquid drops are repelled by the top surface of the third insulating layer 521, which has undergone liquid repellency imparting treatment, and do not adhere thereto. Accordingly, even if the liquid drops land out of the predetermined ejection positions and are ejected onto the top surface of the third insulating layer 521, this top surface is not wetted by the liquid drops, and the repelled liquid drops fall into the opening 521*a* in the third insulating layer 521.

Next, the light emitting layer 360 is formed on the top surface of the hole injection/transporting layer 370. The material that is used to form the light emitting layer 360 is not particularly restricted, and low molecular organic light emitting dyes and light emitting polymers, namely, light emitting substances containing various types of fluorescent substances and phosphorescent substances can be used. Among conjugate polymers that is used as light emitting substances, those that include an arylene-vinylene structure are preferable. Examples of low molecular fluorescent materials that can be used include naphthalene derivatives, anthracene derivatives, perylene derivatives, dyes such as polymethine-based, xanthene-based, coumarin-based, and cyanine-based dyes, metal complexes of 8-hydroquinoline and derivatives thereof, aromatic amines, tetraphenylcyclopentadiene derivatives and the like, or known materials that are described in U.S. Pat. Nos. 4,356,429 and 4,539,507, and the like can be used.

The light emitting layer 360 is formed by the same procedure as in the method used to form the hole injection/transporting layer 370. Namely, after a composition of matter in a liquid form that contains a material of the light emitting layer has been ejected onto a top surface of the hole injection/transporting layer 370 by an inkjet method, preliminary drying step is performed. As a result, the light emitting layer 360 is formed on the hole injection/transporting layer 370 inside the opening 521*a* that is formed in the third insulating layer 521. This light emitting layer forming step is also conducted in an inert gas atmosphere, as described above. Because the ejected composition of matter in a liquid form is repelled in areas that have undergone liquid repellency imparting treatment, even if the liquid drops land out of the predetermined ejection positions, the repelled liquid drops fall into the opening 521*a* in the third insulating layer 521.

Next, the electron transporting layer 350 is formed on the top surface of the light emitting layer 360. The electron transporting layer 350 is also formed by the same method as that used to form the light emitting layer 360, namely, by an inkjet method. The material used to form the electron transporting layer 350 is not particularly restricted, and examples thereof include complex metals of oxadiazole derivatives, anthraquinodimethane and derivatives thereof, benzoquinone and derivatives thereof, naphthoquinone and derivatives thereof, anthraquinone and derivatives thereof, tetracyanoanthraquinodimethane and derivatives thereof, fluorenone derivatives, diphenyl dicyanoethylene and derivatives thereof, diphenoquinone derivatives, and 8-hydroxyquinoline and derivatives thereof. Specifically, similar to the previous materials for forming the hole transporting layer, examples include the materials disclosed in Japanese Unexamined Patent Application, First Publication Nos. S63-70257, S63-175860, H02-135359, H02-135361, H02-209988, H03-37992, and H03-152184 the like, and 2-(4-biphenylyl)-5-(4-t-butylphenyl)-1,3,4-oxadiazole (BPBD), benzoquinone, anthraquinone, tris (8-quinolinole) aluminum are particularly preferable. After the composition of matter in a liquid form has been ejected using the inkjet method, preliminary drying step is performed.

Note that it is also possible to mix the aforementioned material for forming the hole injection/transporting layer 370 and the material for forming the electron transporting layer 350 into the material for forming the light emitting layer 360, and using this as the material for forming the light emitting layer. In this case, although the quantities used of the material for forming the hole injection/transporting layer and the material for forming the electron transporting layer differ depending on the variety and the like of the compounds that are used, the quantities are considered and then determined within a range whereby they do not affect sufficient film forming properties and light emitting characteristics. Normally, the quantities used of the material for forming the hole injection/transporting layer and the material for forming the electron transporting layer are 1 to 40 percent by weight with respect to the quantity of the material for forming the light emitting layer, and more preferably 2 to 30 percent by weight thereof.

Figure 12E:
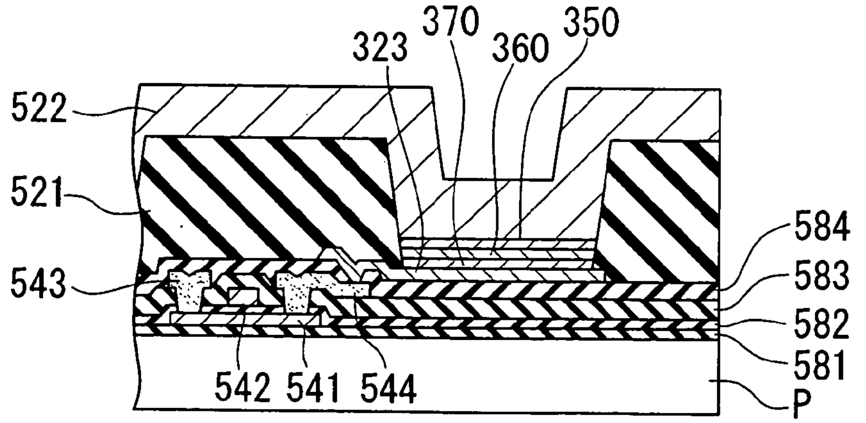

Next, as shown in FIG. 12E, the cathode 522 is formed on the top surface of the electron transporting layer 350 and the third insulating layer 521. The cathode 522 may be formed over the entire surfaces of the electron transporting layer 350 and the third insulating layer 521 or may be formed in a striped configuration thereon. The cathode 522 may be formed as a single layer made of a single element such as Al, Mg, Li, and Ca, or made of an alloy such as Mg:Ag (10:1 alloy), however, it may also be formed as two or three metal layers (including alloys). Specifically, stacked structures such as $Li_2O$ (approximately 0.5 nm)/Al, LiF (approximately 0.5 nm)/Al, and $MgF_2$/Al can be used. The cathode 522 is a thin film made of the above described metals, and is able to transmit light.

Note that, in the above described embodiment, an inkjet method is used when forming their respective insulating layers, however, it is also possible to use an inkjet method when forming the source electrode 543 and drain electrode 544 or when forming the anode 323 and cathode 522. The preliminary drying step is performed after each of the composition of matter in a liquid forms have been ejected.

Examples of the conductive material that is used for the conductive material layer (i.e., the material used to form a device) include predetermined metals or conductive polymers.

Examples of the metal include at least one metal selected from the group consisting of silver, gold, nickel, indium, tin, lead, zinc, titanium, copper, chromium, tantalum, tungsten, palladium, platinum, iron, cobalt, boron, silicon, aluminum, magnesium, scandium, rhodium, iridium, vanadium, ruthenium, osmium, niobium, bismuth, barium, or alloys of these, depending on the use of the metal paste. Additional examples include silver oxide (i.e., AgO or $Ag_2O$) and copper oxide.

As the organic solvent that is used when the above conductive material is made a paste form so that it can be ejected from an ejection head, solvents containing one or more alcohols having 5 or more carbon atoms (for example, terpineol, citronellol, geraniol, nerol, and phenethyl alcohol), or solvents containing one or more organic esters (for example, ethyl acetate, methyl oleate, butyl acetate, and glyceride) may be used, and the organic solvent can be selected as is appropriate to the selection of the metal or metal paste being used. Furthermore, it is also possible to use mineral spirits, tridecane, and dodecylbenzene or mixtures of these, or solvents obtained by mixing these with $\alpha$-terpineol, hydrocarbons having 5 or more carbon atoms (for example, pinene and the like), alcohols (for example, n-heptanol and the like), ethers (for example, ethylbenzylether and the like), esters (for example, n-butylstearate and the like), ketones (for example, diisobutyl ketone and the like), organic nitrogen compounds (for example, triisopropanole amine and the like), organic silicon compounds (for example, silicone oil and the like), organic sulfur compounds, or mixtures of these. Note that, if necessary, it is also possible to add suitable organic material to the organic solvent. The gas temperature when performing the preliminary drying step is set in accordance with the solvent.

A description will now be given of an example of an electronic apparatus 800 that is provided with the organic EL device (i.e., the device) 600 of the above described embodiment.

Figure 13A:
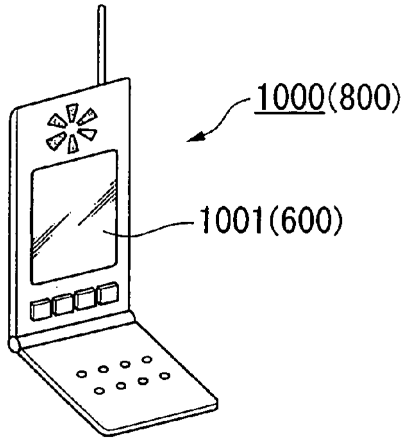
FIGS. 13A to 13D are views showing electronic apparatuses 800 that are provided with the organic EL display device 600.

FIG. 13A is a perspective view showing an example of a mobile telephone. In FIG. 13A, a mobile telephone 1000 (i.e., the electronic apparatus 800) is provided with a display 1001 that includes the above described organic EL device 600.

Figure 13B:
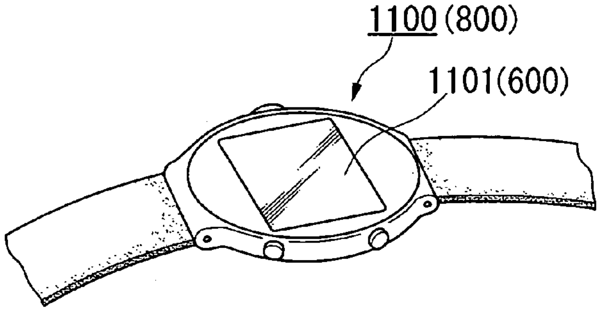

FIG. 13B is a perspective view showing an example of a wristwatch-type electronic apparatus. In FIG. 13B, a wristwatch 1100 (i.e., the electronic apparatus 800) is provided with a display 1101 that includes the above described organic EL device 600.

Figure 13C:
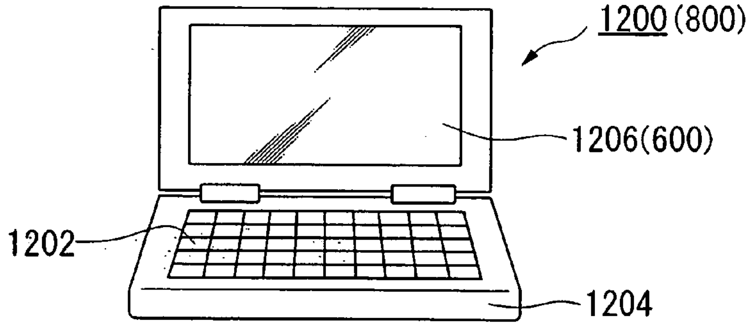

FIG. 13C is a perspective view showing an example of a portable information processing apparatus such as a word processor or personal computer. In FIG. 13C, an information processing apparatus 1200 (i.e., the electronic apparatus 800) is provided with an input device 1202 such as a keyboard, an information processing apparatus main body 1204, and a display 1206 that includes the above described organic EL device 600.

Figure 13D:
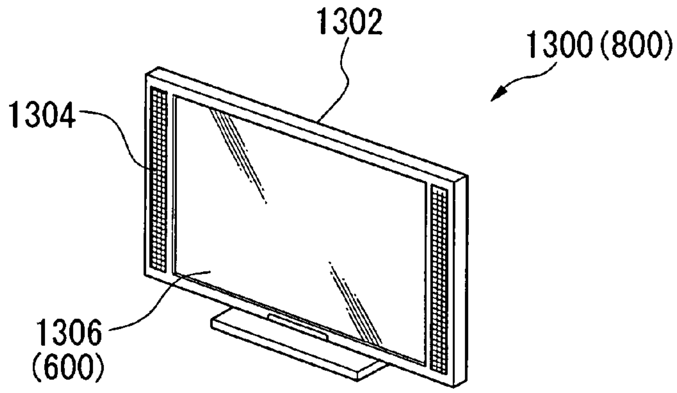

FIG. 13D is a perspective view showing an example of a slimline large screen television. In FIG. 13D, a slimline large screen television (i.e., an electronic apparatus) 1300 is provided with a slimline large screen television main body (i.e., housing) 1302, a sound output unit such as a speaker 1304, and a display 1306 that includes the above described organic EL device 600.

As described above, in the electronic apparatuses 800 shown in FIGS. 13A to 13D, because the organic EL display device 600 is provided as the displays 1001, 1101, 1206, and 1306, an electronic apparatus 800 having an excellent display quality and a bright screen is achieved.

In the above described embodiment, the method of the present invention is applied to the formation of a wiring pattern of a TFT that is used to drive an organic EL display device, however, the method is not limited to an organic EL display device and it can also be applied to the manufacturing of a variety of devices having multilayered wiring, such as to the manufacturing of wiring patterns of plasma display panel (PDP) devices, and the manufacturing of wiring patterns of liquid crystal display devices. In addition, when manufacturing a variety of multilayered display devices, an inkjet method can be applied when forming the material layer of either a conductive material layer or an insulating material layer.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A method for forming a pattern on a substrate, comprising the steps of:

ejecting liquid drops from an ejection head having nozzles onto a reference plate on which a plurality of blocks are defined, a plurality of target positions being defined in each block, the target positions being arranged in a plurality of rows in a predetermined pattern;

detecting an amount of a displacement between the target positions and the positions at which the liquid drops have actually landed; determining a relative positional error relative to the ejection head for each of the plurality of rows of the target positions based on the amount of the displacement; determining a correction value for each of the plurality of rows based on the relative positional error; and sequentially changing a relative position of the substrate and the ejection head based on the correction values while ejecting the liquid drops onto the substrate, wherein the target positions are based on a plurality of marks formed on the reference plate; and wherein a spacing between the target positions in a first direction is approximately twice a spacing between nozzle holes of the ejection head.

2. A device that is manufactured using the method for forming a pattern on a substrate according to claim 1.

3. The method according to claim 1, wherein the marks are of approximately the same size as that of the liquid drops ejected on the reference plate from the ejection head.

4. The method according to claim 1, wherein the predetermined pattern is a polka dot pattern.

* * * * *